USO11253935B2

(12) United States Patent
Nishikawa et al.

(10) Patent No.: US 11,253,935 B2
(45) Date of Patent: Feb. 22, 2022

(54) SEGMENTED CUTTING TYPE TIPPED SAW BLADE

(71) Applicant: KANEFUSA KABUSHIKI KAISHA, Aichi (JP)

(72) Inventors: Yukiomi Nishikawa, Aichi-ken (JP); Chika Tsuzuki, Aichi-ken (JP); Tomoaki Watanabe, Aichi-ken (JP)

(73) Assignee: KANEFUSA KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/049,084

(22) PCT Filed: Apr. 19, 2019

(86) PCT No.: PCT/JP2019/016822
§ 371 (c)(1),
(2) Date: Oct. 20, 2020

(87) PCT Pub. No.: WO2019/203346
PCT Pub. Date: Oct. 24, 2019

(65) Prior Publication Data
US 2021/0237181 A1 Aug. 5, 2021

(30) Foreign Application Priority Data
Apr. 20, 2018 (JP) .............................. JP2018-081624

(51) Int. Cl.
B23D 61/04 (2006.01)
B23D 61/02 (2006.01)

(52) U.S. Cl.
CPC ........... *B23D 61/04* (2013.01); *B23D 61/021* (2013.01)

(58) Field of Classification Search
CPC .... B23D 61/04; B23D 61/021; B23D 45/003; B23D 45/16; B23D 45/02; B27B 33/08;
(Continued)

(56) References Cited

U.S. PATENT DOCUMENTS 4,034,638 A * 7/1977 Drum ................... B23D 61/021
83/835
4,640,172 A * 2/1987 Kullmann .......... B23Q 11/0039
83/835
(Continued)

FOREIGN PATENT DOCUMENTS

CA 2113047 C 10/1999
EP 3162483 A1 5/2017
(Continued)

OTHER PUBLICATIONS

PCT/JP2019/016822 International Preliminary Report on Patentability dated Oct. 29, 2020 (9 p.).
(Continued)

*Primary Examiner* — Ghassem Alie
(74) *Attorney, Agent, or Firm* — Conley Rose, P.C.

(57) ABSTRACT

A segmented cutting type tipped saw blade includes a first ridge tip, a second ridge tip, a first end tip, and a second end tip. A first end of the first end tip, a second end of the second end tip, a tip end of the first ridge tip, and a tip end of the second ridge tip project radially outward. A top bevel surface extending from the first end and a top bevel surface extending from the second end, a first bevel surface and a second bevel surface extending from the tip end of the first ridge tip and a first bevel surface and a second bevel surface extending from the tip end of the second ridge tip each have a top bevel angle of greater than or equal to 3° and less than or equal to 10°.

16 Claims, 32 Drawing Sheets

(58) Field of Classification Search
CPC .......... Y10T 83/9403; Y10T 83/9319; Y10T 83/9355; Y10T 83/935; Y10T 83/9317; Y10T 83/9358
USPC ......... 83/835, 676, 855, 661, 848, 849, 850, 83/851, 852, 853, 854
See application file for complete search history.

(56) References Cited

U.S. PATENT DOCUMENTS

| | | | | |
|---|---|---|---|---|
| 4,690,024 | A * | 9/1987 | Chaconas | B23D 61/02 76/112 |
| 5,331,876 | A * | 7/1994 | Hayden, Sr. | B23D 61/021 83/661 |
| 9,162,299 | B2 | 10/2015 | Kullmann et al. | |
| 10,279,407 | B2 * | 5/2019 | Brutscher | B23D 61/025 |
| 2006/0156892 | A1 * | 7/2006 | Losse | B27B 33/08 83/835 |
| 2018/0099341 | A1 * | 4/2018 | Rakurty | B23D 61/123 |
| 2019/0151970 | A1 * | 5/2019 | Strand | B27B 33/08 |
| 2020/0316700 | A1 * | 10/2020 | Elliston | B23D 61/021 |

FOREIGN PATENT DOCUMENTS

| | | |
|---|---|---|
| JP | S63169215 U | 11/1988 |
| JP | H0737528 U | 7/1995 |
| JP | H08187702 A | 7/1996 |
| JP | H08281606 A | 10/1996 |
| JP | H09290323 A | 11/1997 |
| JP | H11277330 A | 10/1999 |
| JP | 3212951 B2 | 9/2001 |
| JP | 3370166 B2 | 1/2003 |
| JP | 2004066400 A | 3/2004 |
| JP | 6163706 B2 | 7/2017 |
| WO | 96/21545 A1 | 7/1996 |

OTHER PUBLICATIONS

PCT/JP2019/016822 International Search Report and Written Opinion dated Jul. 16, 2019 (8 p.).
Extended European search report dated Nov. 24, 2021 issued in EP Patent Application No. 19787709.5 (8 pages).

* cited by examiner

| | NET CUTTING POWER (W) | LOUDNESS (sone) | SOUND PRESSURE LEVEL (dB) |
|---|---|---|---|
| TEST PRODUCT 100 | 511 | 154.8 | 105.52 |
| TEST PRODUCT 110 | 518 | 145.23 | 102.41 |
| TEST PRODUCT 120 | 465 | 148.09 | 101.44 |
| TEST PRODUCT 140 | 397 | 126.14 | 98.69 |
| TEST PRODUCT 150 | 395 | 126.45 | 98.63 |

FIG. 34

| POWER REDUCTION RATE | REFERENCE | | |
|---|---|---|---|
| | TEST PRODUCT 100 | TEST PRODUCT 110 | TEST PRODUCT 120 |
| TEST PRODUCT 140 | 22% | 23% | 15% |
| TEST PRODUCT 150 | 23% | 24% | 15% |

FIG. 35

| LOUDNESS REDUCTION RATE | REFERENCE | | |
|---|---|---|---|
| | TEST PRODUCT 100 | TEST PRODUCT 110 | TEST PRODUCT 120 |
| TEST PRODUCT 140 | 19% | 13% | 15% |
| TEST PRODUCT 150 | 18% | 13% | 15% |

FIG. 36

NET CUTTING POWER (W)

| | | TOP BEVEL ANGLE | | | | |
|---|---|---|---|---|---|---|
| | | 3° | 5° | 7° | 10° | 12° |
| NUMBER OF SEGMENTS | 3 SEGMENTS | | TEST PRODUCT350 272 | | | |
| | 4 SEGMENTS | TEST PRODUCT200 267 | TEST PRODUCT210 241 | TEST PRODUCT220 230 | TEST PRODUCT230 249 | TEST PRODUCT240 266 |
| | 5 SEGMENTS | TEST PRODUCT250 241 | TEST PRODUCT260 214 | TEST PRODUCT270 222 | TEST PRODUCT280 223 | TEST PRODUCT290 221 |
| | 6 SEGMENTS | TEST PRODUCT300 249 | TEST PRODUCT310 225 | TEST PRODUCT320 209 | TEST PRODUCT330 213 | TEST PRODUCT340 217 |
| | 10 SEGMENTS | | TEST PRODUCT360 241 | | | |

FIG. 39

LOUDNESS (sone)

| | | TOP BEVEL ANGLE | | | | | | | | |
|---|---|---|---|---|---|---|---|---|---|---|
| | | 3° | | 5° | | 7° | | 10° | | 12° |
| NUMBER OF SEGMENTS | 3 SEGMENTS | | | TEST PRODUCT350 | 94.3 | | | | | |
| | 4 SEGMENTS | TEST PRODUCT200 | 91.1 | TEST PRODUCT210 | 88.2 | TEST PRODUCT220 | 86.1 | TEST PRODUCT230 | 94.8 | TEST PRODUCT240 | 103.9 |
| | 5 SEGMENTS | TEST PRODUCT250 | 85.7 | TEST PRODUCT260 | 80.4 | TEST PRODUCT270 | 82.2 | TEST PRODUCT280 | 92.8 | TEST PRODUCT290 | 93.0 |
| | 6 SEGMENTS | TEST PRODUCT300 | 87.1 | TEST PRODUCT310 | 79.8 | TEST PRODUCT320 | 78.4 | TEST PRODUCT330 | 85.7 | TEST PRODUCT340 | 84.9 |
| | 10 SEGMENTS | | | TEST PRODUCT360 | 86.4 | | | | | |

FIG. 41

A-CHARACTERISTIC SOUND PRESSURE LEVEL (dB)

| | TOP BEVEL ANGLE | | | | |
|---|---|---|---|---|---|
| | 3° | 5° | 7° | 10° | 12° |
| 3 SEGMENTS | | TEST PRODUCT350 97.6 | | | |
| 4 SEGMENTS | TEST PRODUCT200 98.6 | TEST PRODUCT210 95.8 | TEST PRODUCT220 94.9 | TEST PRODUCT230 95.7 | TEST PRODUCT240 97.9 |
| 5 SEGMENTS | TEST PRODUCT250 97.0 | TEST PRODUCT260 92.3 | TEST PRODUCT270 92.1 | TEST PRODUCT280 93.3 | TEST PRODUCT290 94.6 |
| 6 SEGMENTS | TEST PRODUCT300 94.9 | TEST PRODUCT310 92.8 | TEST PRODUCT320 92.2 | TEST PRODUCT330 92.6 | TEST PRODUCT340 93.6 |
| 10 SEGMENTS | | TEST PRODUCT360 93.8 | | | |

(NUMBER OF SEGMENTS)

FIG. 43

POWER REDUCTION RATE

| | | TOP BEVEL ANGLE | | | | |
|---|---|---|---|---|---|---|
| | | 3° | 5° | 7° | 10° | 12° |
| NUMBER OF SEGMENTS | 3 SEGMENTS | TEST PRODUCT200<br>2% | TEST PRODUCT350<br>0% | | | |
| | 4 SEGMENTS | TEST PRODUCT250<br>11% | TEST PRODUCT210<br>11% | TEST PRODUCT220<br>15% | TEST PRODUCT230<br>8% | TEST PRODUCT240<br>2% |
| | 5 SEGMENTS | TEST PRODUCT300<br>8% | TEST PRODUCT260<br>21% | TEST PRODUCT270<br>18% | TEST PRODUCT280<br>18% | TEST PRODUCT290<br>19% |
| | 6 SEGMENTS | | TEST PRODUCT310<br>17% | TEST PRODUCT320<br>23% | TEST PRODUCT330<br>23% | TEST PRODUCT340<br>20% |
| | 10 SEGMENTS | | TEST PRODUCT360<br>11% | | | |

FIG. 45

LOUDNESS REDUCTION RATE

| | TOP BEVEL ANGLE | | | | |
|---|---|---|---|---|---|
| | 3° | 5° | 7° | 10° | 12° |
| 3 SEGMENTS | TEST PRODUCT200 3% | TEST PRODUCT350 0% | | | |
| 4 SEGMENTS | TEST PRODUCT250 9% | TEST PRODUCT210 6% | TEST PRODUCT220 9% | TEST PRODUCT230 −1% | TEST PRODUCT240 −10% |
| 5 SEGMENTS | TEST PRODUCT300 8% | TEST PRODUCT260 15% | TEST PRODUCT270 13% | TEST PRODUCT280 2% | TEST PRODUCT290 1% |
| 6 SEGMENTS | | TEST PRODUCT310 15% | TEST PRODUCT320 17% | TEST PRODUCT330 9% | TEST PRODUCT340 10% |
| 10 SEGMENTS | | TEST PRODUCT360 8% | | | |

NUMBER OF SEGMENTS

FIG. 46

|  | NET CUTTING POWER (W) | LOUDNESS (sone) | SOUND PRESSURE LEVEL (dB) |
| --- | --- | --- | --- |
| TEST PRODUCT210 | 241 | 88.2 | 95.8 |
| TEST PRODUCT400 | 230 | 93.9 | 96.0 |
| TEST PRODUCT410 | 235 | 97.3 | 97.4 |
| TEST PRODUCT420 | 236 | 109.9 | 98.8 |

FIG. 50

| POWER REDUCTION RATE | REFERENCE |
| --- | --- |
| | TEST PRODUCT210 |
| TEST PRODUCT400 | 4% |
| TEST PRODUCT410 | 2% |
| TEST PRODUCT420 | 2% |

FIG. 51

| LOUDNESS REDUCTION RATE | REFERENCE |
| --- | --- |
| | TEST PRODUCT210 |
| TEST PRODUCT400 | -6% |
| TEST PRODUCT410 | -10% |
| TEST PRODUCT420 | -25% |

FIG. 52

SEGMENTED CUTTING TYPE TIPPED SAW BLADE

CROSS-REFERENCE TO RELATED APPLICATIONS

The present application is a 35 U.S.C. § 371 U.S. National Phase entry of, and claims priority to, PCT Application No. PCT/JP2019/016822, filed Apr. 19, 2019, which claims priority to Japanese Patent Application No. 2018-081624, filed Apr. 20, 2018, both of which are incorporated herein by reference in their entireties for all purposes.

STATEMENT REGARDING FEDERALLY SPONSORED RESEARCH OR DEVELOPMENT

Not applicable.

BACKGROUND

The present disclosure relates generally to segmented cutting type tipped saw blades. Segmented cutting type tipped saw blades form grooves in workpieces made of, for example, steel materials such as a pipe, or non-ferrous materials, such as an aluminum, so as to cut the workpieces. The segmented cutting type tipped saw blades produce chips split generally in the width direction of the grooves when forming the grooves in the workpieces.

Segmented cutting type tipped saw blades are disclosed in Japanese Patent No. 3212951, Japanese Laid-Open Patent Publication No. H08-187702, Japanese Laid-Open Patent Publication No. H09-290323, Japanese Patent No. 3370166, Japanese Patent No. 6163706, and Japanese Laid-Open Utility-Model Publication No. S63-169215. A segmented cutting type tipped saw blade includes a metal disc-shaped base and a plurality of tips joined at and around an outer periphery of the metal base. The plurality of the tips may include various types of tips, some having different tip end profiles than others. A plurality of groups of tips may be arranged along the peripheral edge of the metal base. Each of groups includes various types of tips that are circumferentially adjacent to each other.

The tip end profiles of the tips of a segmented cutting type tipped saw blade are configured to cut different portions of the groove in the width direction of the groove. For example, four tips having different tip end profiles are designed to cut respective portions of the groove, the portions defined by dividing the groove into four adjacent sections in the width direction of the groove. Therefore, locations where chips are generated by cutting may differ in the width direction of the groove depending on each tip shape. The chips are split into small pieces, so that the chips are more easily discharged from the inside of the grooves. Since the chips are prevented from entering between the tips and the workpiece, the cutting efficiency can be enhanced. In addition, the respective tips of the segmented cutting type tipped saw blade have small contact areas with the grooves. Accordingly, the friction force between the tips and the workpiece is reduced. As a result, the cutting resistance and noise accompanied by cutting may be reduced. Further, a smooth cut surface of the workpiece cut by the segmented cutting type tipped saw blade may be obtained.

BRIEF SUMMARY

According to one aspect of the present disclosure, a segmented cutting type tipped saw blade may include a disc-shaped metal base and a plurality of tips joined around an outer periphery of the metal base. The plurality of tips may include a first end tip, a second end tip, a first ridge tip, and a second ridge tip. The first end tip includes a tip end projecting radially outward on a first end in the thickness direction of the metal base, as seen from the circumferential direction of the metal base. The second end tip includes a tip end projecting radially outward on a second end in the thickness direction of the metal base. The first ridge tip includes a tip end projecting radially outward in a first position between the first end and the second end. The second ridge tip includes a tip end projecting radially outward in a second position between the first end and the second end.

The first end tip and the second end tip include a top bevel surface extending from the respective tip ends to the other ends. The first ridge tip and the second ridge tip include a first bevel surface extending from the respective tip ends to the first end and a second bevel surface extending from the respective tip ends to the second end. Each top bevel surface, first bevel surface, and second bevel surface has a top bevel angle with respect to a virtual line extending parallel to the central axis of the metal base through the respective tip ends. Each top bevel angle is greater than or equal to 3° and less than or equal to 10°.

This structure includes at least 4 types of tips, and each of the tips has a top bevel angle of greater than or equal to 3° and less than or equal to 10°. By having these two features, a smooth cut surface for the workpiece can be obtained and the cutting resistance can be reduced. Based on the results of studies and experiments, it was found that these effects are remarkable compared to conventional products. In addition, with this structure, it is also possible to reduce the sound pressure level generated during cutting.

According to another aspect of the present disclosure, the plurality of tips may be formed of only 4 types of tips, such as a first end tip, a second end tip, a first ridge tip, and a second ridge tip. Alternatively, the plurality of tips may be formed of only 5 types of tips, further including a third ridge tip having a tip end projecting radially outward in a third position between the first end and the second end in addition to the 4 types. Alternatively, the plurality of tips may be formed of only 6 types of tips, further including a fourth ridge tip having a tip end projecting radially outward in a fourth position between the first end and the second end in addition to the 5 types. With the segmented cutting type tipped saw blade having these features, the cutting resistance and the sound pressure level can be reduced while a smooth cut surface of the workpiece can be achieved as compared with conventional products. In the tipped saw blade formed of the 4 types of tips, the top bevel angle of all tips is set to be greater than or equal to 3° and less than or equal to 10°.

According to another aspect of the present disclosure, a third ridge tip and a fourth ridge tip may include a first bevel surface inclined from the respective tip ends to the first end and a second bevel surface inclined from the respective tip ends to the second end. Each of the first bevel surfaces and each of the second bevel surfaces of the third ridge tip and the fourth ridge tip includes a top bevel angle with respect to a virtual line extending parallel to the central axis of the metal base through the respective tip ends. Each top bevel angle is greater than or equal to 3° and less than or equal to 10°. Therefore, in the tipped saw blade formed of 5 types or 6 types of tips, the top bevel angle of all tips is set to be greater than or equal to 3° and less than or equal to 10°. With the segmented cutting type tipped saw blade having these features, the cutting resistance and the sound pressure level can be reduced, while a smooth cut surface of the workpiece can be obtained, as compared with conventional products.

According to another aspect of the present disclosure, the respective top bevel angle of the respective tips may be set to be greater than or equal to 5° and less than or equal to 10°. Alternatively, the top bevel angle of the respective tips may be set to be greater than or equal to 6° and less than or equal to 8°. Therefore, by setting the top bevel angle of the respective tips of the segmented cutting type tipped saw blade within the predetermined range, the cutting resistance and the sound pressure level can be reduced while a cut surface of the workpiece may be made smoother.

According to another aspect of the present disclosure, in the segmented cutting type tipped saw blade, all the respective top bevel angles of the respective tips and the radial positions of the respective tip ends of the respective tips may be identical. Therefore, it is possible to grind the respective inclined surfaces without changing the inclination angle of the grinding wheel.

According to another aspect of the present disclosure, the radial positions of the respective tip ends of the first ridge tip and the second ridge tip may be 0 to 25% of the length in the thickness direction of the respective tips further radially outward than the radial positions of the respective tip ends of the first end tip and the second end tip, preferably at 0 to 5% of the length in the thickness direction of the respective tips further radially outward. Therefore, the first and the second ridge tips come more reliably in contact with the workpiece when cutting the workpiece. This allows the cutting power to be distributed in a more well balanced manner among the first and the second ridge tips in addition to the first and the second end tips. As a result, the cutting resistance will not be concentrated on specific tips, such that the cutting resistance can be reduced.

BRIEF DESCRIPTION OF THE DRAWINGS

FIG. 34 is a table illustrating a comparison of the net cutting power, noise (loudness), and sound pressure level when each of the tipped saw blades cuts a workpiece.

FIG. 35 is a table illustrating a reduction percentages of the net cutting power of each of the segmented cutting type tipped saw blades in comparison with conventional test products.

FIG. 36 is a table illustrating a reduction percentages of the noise (loudness) of each of the segmented cutting type tipped saw blades in comparison with conventional test products.

FIG. 39 is a table illustrating the net cutting power when cutting a workpiece by the respective tipped saw blades having various numbers of segments and various top bevel angles.

FIG. 41 is a table showing the result of the noise (loudness) when cutting the workpiece by the respective tipped saw blades having various numbers of segments and various top bevel angles.

FIG. 43 is a table showing A-characteristic sound pressure levels when cutting the workpiece by the respective tipped saw blades having various numbers of segments and various top bevel angles.

FIG. 45 is a table showing the reduction percentages of the net cutting power of each of the test products in comparison with the test product having three segments and a top bevel angle of 5°.

FIG. 46 is a table showing the reduction percentages of the loudness of each of the test products in comparison with the test product having three segments and a top bevel angle of 5°.

FIG. 50 is a table showing the net cutting power, loudness, and sound pressure level when cutting a workpiece by each of the tipped saw blades having the ridge tips and the end tips set at various tip end heights.

FIG. 51 is a table showing reduction percentages of the net cutting power of a test product having tips illustrated in FIG. 49 in comparison with a test product having tips illustrated in FIG. 3.

FIG. 52 is a table showing reduction percentages of loudness of the test product having tips illustrated in FIG. 49 in comparison with the test product having tips illustrated in FIG. 3.

DETAILED DESCRIPTION

Embodiments of tipped saw blades such as circular saw blades can be used, for example, in a rechargeable tipped saw cutter (electric circular saw). To improve the workability of the rechargeable tipped saw cutter, a tipped saw that reduces consumption of battery power has been desired. Alternatively, the tipped saw blade may be a circular saw blade provided, for example, in a stationary tipped saw cutter (tipped saw cutting machine). For the purpose of improving the workability of the stationary electric circular saw, a tipped saw blade, which achieves high cutting efficiency and short cutting time, has been desired. Therefore, there is a need for a tipped saw blade with low cutting resistance and low power required for performing the cut, while still forming a smooth cut surface.

Figure 1:
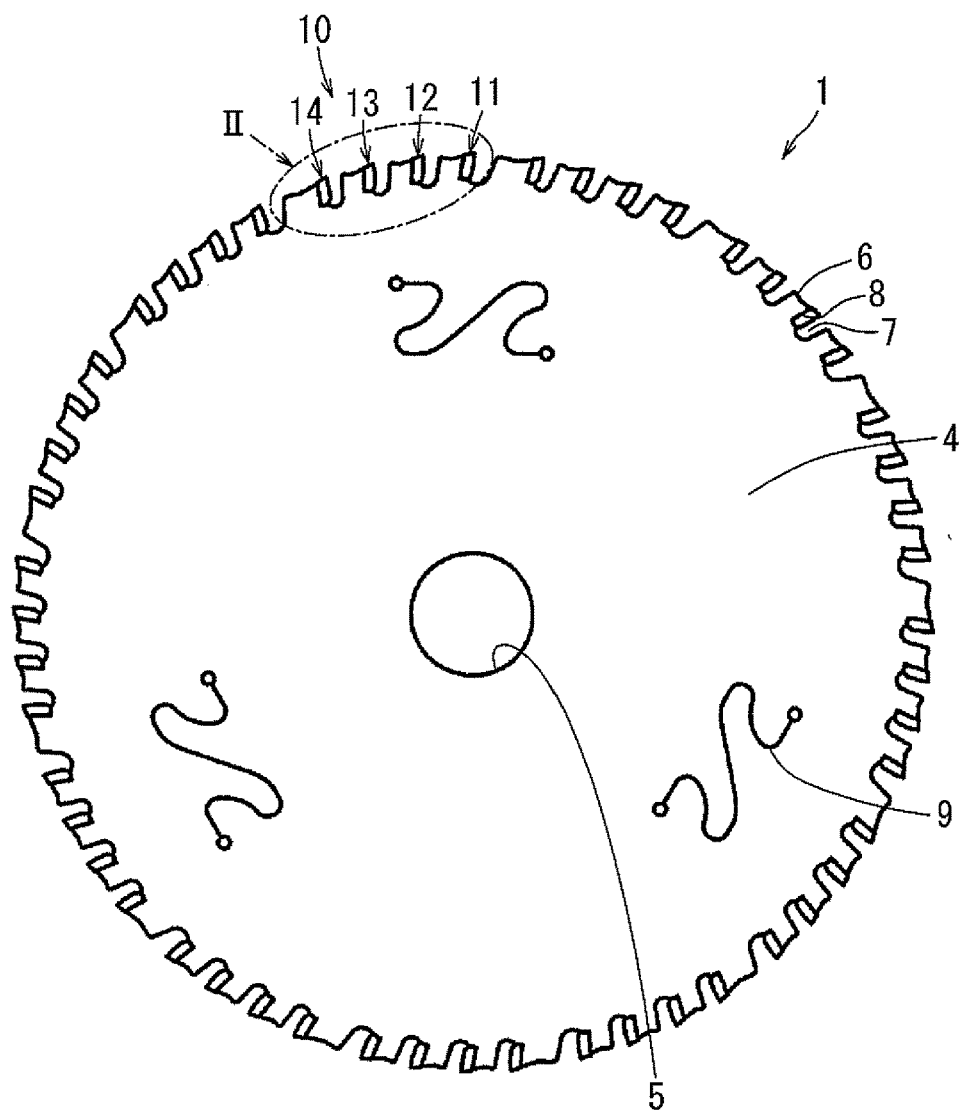
FIG. 1 is a front view of an embodiment of a segmented cutting type tipped saw blade with four segments in accordance with the principles described herein.

Hereinafter, one embodiment of the present disclosure will be described with reference to FIGS. 1 to 3. As shown in FIG. 1, a segmented cutting type tipped saw blade 1 includes a disc-shaped metal base 4, a first ridge tip 11, a second ridge tip 12 circumferentially adjacent the first ridge tip 11, a first end tip 13 circumferentially adjacent the second ridge tip 12, and a second end tip 14 circumferentially adjacent the first tip end 13. Respective teeth for the first ridge tip 11, the second ridge tip 12, the first end tip 13, and the second end tip 14 are aligned along the radially outer peripheral edge of the metal base 4 and form a groups of tips 10. The segmented cutting type tipped saw blade 1 is configured to cut and process workpieces made of a steel material, such as, for example, carbon steel, rolled steel for general structures, chrome molybdenum steel, stainless steel, cast iron, etc. Alternatively, the segmented cutting type tipped saw blade 1 is configured to cut and process non-ferrous metal workpieces, such as, for example, aluminum, aluminum alloys, copper, and copper alloys.

As shown in FIG. 1, a substantially circular mounting hole 5 is provided in the center of the metal base 4. The mounting hole 5 extends through the thickness direction of the metal base 4. A rotary shaft of a cutting tool, such as an electric circular saw, is inserted into the mounting hole 5, such that the segmented cutting type tipped saw blade 1 can be attached to the cutting tool. The segmented cutting type tipped saw blade 1 rotates, clockwise in FIG. 1, about a central or rotational axis extending through the circular center of the metal base 4 as the rotary shaft of the cutting tool rotates. In the following description, the front of the rotation direction of the segmented cutting type tipped saw blade 1 is considered the leading or front side of each of the tips.

As shown in FIG. 1, a plurality of projections 6 extend radially outward of the metal base 4. A circumferentially recessed gullet 7 is formed between each pair of circumferentially adjacent projections 6. A rectangular notched tip seat 8 is provided on the front side of each projection 6 of the segmented cutting type tipped saw blade 1. A plurality of meandering damping slots 9 are formed on the disc surface of the metal base 4.

Figure 2:
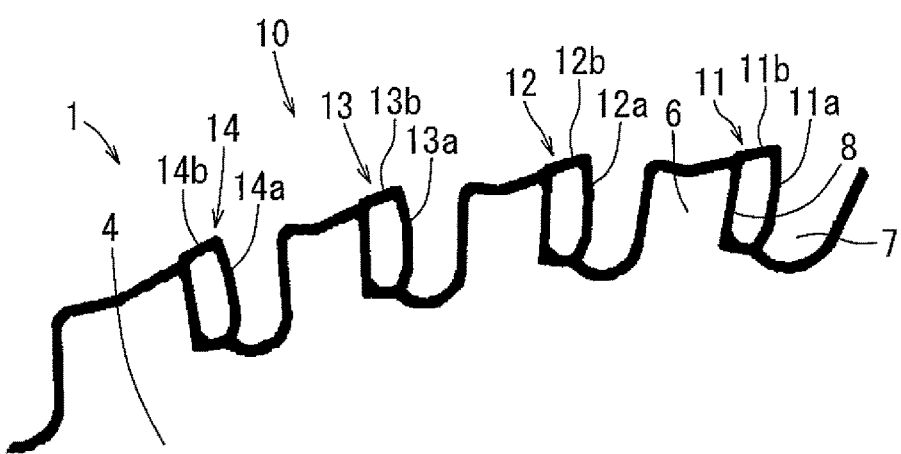
FIG. 2 is an enlarged, partial front view of the saw blade of FIG. 1 taken along a portion II in FIG. 1.

As show in FIGS. 1 and 2, the first ridge tip 11, the second ridge tip 12, the first end tip 13, or the second end tip 14 are disposed in corresponding tip seats 8. In this embodiment, the first ridge tip 11, the second ridge tip 12, the first end tip 13, and the second end tip 14 are arranged in the recited order, from a leading position relative to the direction of rotation of the segmented cutting type tipped saw blade 1 to a trailing position relative to the direction of rotation of the segmented cutting type tipped saw blade 1. In other embodiments, the tips may be arranged in different orders relative to the direction of rotation of the segmented cutting type tipped saw blade 1. Each of the tips may be formed of, for example, a carbide or cermet. Alternatively, each of the tips may be made of, for example, a cemented carbide or cermet with a surface treatment such as a coating, etc.

As shown in FIG. 2, the first ridge tip 11 includes a rake face 11*a* on its front side relative to the rotation direction of the segmented cutting type tipped saw blade 1. A rake angle of the rake face 11*a* with respect to the radial direction of the metal base 4 is substantially 0°. The first ridge tip 11 also includes a radially outer flank 11*b* extending rearwardly relative to the direction of rotation of the saw blade 1 from the rake face 11*a*. As shown in FIG. 3, the first ridge tip 11 includes a first end 11*f* located at a tip end position (one end of the metal base 4 in the thickness direction) (on the left end as shown in FIG. 3), and a second end 11*g* located at the opposite tip end position (on the right end as shown in FIG. 3). The distance between the first end 11*f* and the second end 11*g* corresponds to the tooth thickness 11*j*, which may be, for example, 1.1 mm. The first ridge tip 11 has a tip end 11*e* in a location between the first end 11*f* and the second end 11*g*. The tip end 11*e* may be at a position substantially one-third of the tooth thickness 11*j* from the first end 11*f* in a thickness direction (first location). The tip end 11*e* projects radially outward away from the metal base 4 and corresponds to the peak of the ridge between the first end 11*f* and the second end 11*g*. The first ridge tip 11 includes a first bevel surface 11*c* extending from the tip end 11*e* to the first end 11*f* and a second bevel surface 11*d* extending from the tip end 11*e* to the second end 11*g*.

Figure 3:
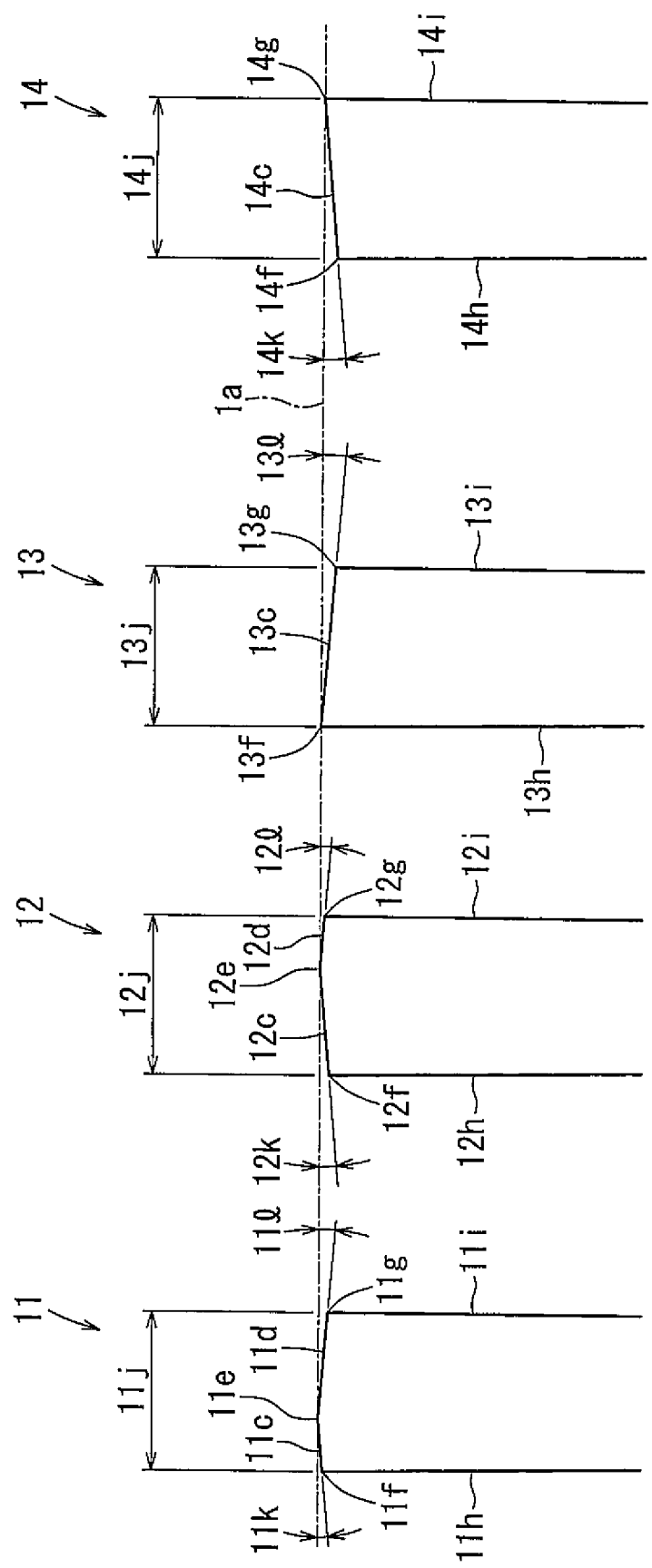
FIG. 3 is an end view in the circumferential direction of the tooth profiles of the tips for the segmented cutting type tipped saw blade of FIG. 1 with four segments.

As shown in FIG. 3, the first bevel surface 11*c* is inclined at a first top bevel angle 11*k*, measured with respect to a virtual line 1*a* extending parallel to the central axis of the metal base 4 and passes through the tip end 11*e*. The second bevel surface 11*d* is inclined at a second top bevel angle 11*l*, measured with respect to the virtual line 1*a*. The first top bevel angle 11*k* and the second top bevel angle 11*l* may each be greater than or equal to 3° and less than or equal to 10°, for example 5°. The first ridge tip 11 includes a first side end face 11*h* extending radially from the first end 11*f* and a second side end face 11*i* extending radially from the second end 11*g*. The first side end face 11*h* and the second side end face 11*i* may have an angle greater than 0° and less than or equal to 1°, measured with respect to the radial direction of the metal base 4. For example, each of the first and second side end faces 11*h*, 11*i* may have an inclination angle closer to the inside of 30' to enable a reduced contact area between the workpiece and the first side end face 11*h* or the second side end face 11*i*. This reduces the cutting resistance. Moreover, since the first end 11*f* and the second end 11*g* are inclined to such an extent that they do not project too far away from the cut surface of the workpiece, a smooth cut surface finish can be achieved.

As shown in FIG. 2, the second ridge tip 12 also includes, similar to the first ridge tip 11, a rake face 12*a* and a flank 12*b*, which includes a first bevel surface 12*c* and a second bevel surface 12*d*. As shown in FIG. 3, the second ridge tip 12 includes a first end 12*f* and a second end 12*g* relative to the thickness direction. The second ridge tip 12 has a tooth thickness 12*j* of, for example, 1.1 mm. The second ridge tip 12 has a tip end 12*e* in a location between the first end 12*f* and the second end 12*g*. The tip end 12*e* may be at a position substantially one third of the tooth thickness 12*j* from the second end 12*g* in the thickness direction (second location). The second ridge tip 12 includes a first bevel surface 12*c* extending from the tip end 12*e* to the first end 12*f* and a second bevel surface 12*d* extending from the tip end 12*e* to the second end 12*g*. The first bevel surface 12*c* is inclined by a first top bevel angle 12*k* with respect to the virtual line 1*a*. The second bevel surface 12*d* is inclined by a second top bevel angle 12*l* with respect to the virtual line 1*a*. Each of the first top bevel angle 12*k* and the second top bevel angle 12*l* may be greater than or equal to 3° and less than or equal to 10°, for example, 5°.

As shown in FIG. 3, the second ridge tip 12 also includes, similar to the first ridge tip 11, a first side end face 12*h* and a second side end face 12*i*. The first side end face 12*h* and the second side end face 12*i* may have an angle greater than 0° and less than or equal to 1° with respect to the radial direction of the metal base 4. For example, each of the first and second side end faces 12*h*, 12*i* may have an inclination angle closer to the inside of 30'.

As shown in FIG. 2, the first end tip 13 also includes, similar to the first ridge tip 11, a rake face 13*a* and a flank 13*b* (corresponding to a top bevel surface 13*c*). As shown in FIG. 3, the first end tip 13 includes a first end 13*f* and a second end 13*g* relative to the thickness direction. The first end tip 13 has a tooth thickness 13*j* of, for example, 1.1 mm. The first end tip 13 has a top bevel surface 13*c* extending from the first end 13*f* to the second end 13*g*. The top bevel surface 13*c* may be inclined by a top bevel angle 13*l* with respect to the virtual line 1*a*. The top bevel angle 13*l* may be greater than or equal to 3° and less than or equal to 10°, for example, 5°.

As shown in FIG. 3, the first end tip 13 also includes, similar to the first ridge tip 11, a first side end face 13*h* and a second side end face 13*i*. The first side end face 13*h* and the second side end face 13*i* may be inclined by an angle greater than 0° and less than or equal to 1° with respect to the radial direction of the metal base 4. For example, each of the first and second side end faces 13*h*, 13*i* may have an inclination angle closer to the inside of 30'.

As shown in FIG. 2, the second end tip 14 also includes, similar to the first ridge tip 11, a rake face 14*a* and a flank 14*b* (corresponding to a top bevel surface 14*c*). As shown in FIG. 3, the second end tip 14 includes a first end 14*f* and a second end 14*g* relative to the thickness direction. The second end tip 14 has a tooth thickness 14*j* of, for example, 1.1 mm. The second end tip 14 has a top bevel surface 14*c* extending from the second end 14*g* to the first end 14*f*. The top bevel surface 14*c* may be inclined by a top bevel angle 14*k* with respect to the virtual line 1*a*. The top bevel angle 14*k* may be greater than or equal to 3° and less than or equal to 10°, for example, 5°.

As shown in FIG. 3, the second end tip 14 also includes, similar to the first ridge tip 11, a first side end face 14*h* and a second side end face 14*i*. The first side end face 14*h* and the second side end face 14*i* may be inclined by an angle greater than 0° and less than or equal to 1° with respect to the radial direction of the metal base 4. For example, each of the first and second side end faces 14*h*, 14*i* may have an inclination angle closer to the inside of 30'.

As shown in FIGS. 1 and 3, the segmented cutting type tipped saw blade 1 may have four types of tips, such as the first ridge tip 11, the second ridge tip 12, the first end tip 13, and the second end tip 14. The first end tip 13 may have a first end 13*f* projecting radially outward relative to the metal base 4, and the second end tip 14 may have a second end 14*g* projecting radially outward relative to the metal base 4. The first ridge tip 11 includes a tip end 11e projecting radially outward relative to the metal base 4, the tip end 11e being in a location substantially one third of the tooth thickness 11j from the first end 11f in the thickness direction. The second ridge tip 12 includes a tip end 12e projecting radially outward relative to the metal base 4, the tip end 12e being in a location substantially one third of the tooth thickness 11j from the second end 12g in the thickness direction of the metal base 4.

As shown in FIG. 3, the top bevel angle 13l of the top bevel surface 13c of the first end tip 13, the top bevel angle 14k of the top bevel surface 14c of the second end tip 14, the first top bevel angle 11k of the first bevel surface 11c of the first edge tip 11, the second top bevel angle 11l of the second bevel surface 11d of the first edge tip 11, the first top bevel angle 12k of the first bevel surface 12c of the second edge tip 12, and the second top bevel angle 12l of the second inclined angle 12d of the second edge tip 12 may each be inclined with respect to the virtual line 1a by an angle greater than or equal to 3° and less than or equal to 10°, for example, 5°. Preferably, all of these inclination angles 11k, 11l, 12k, 12l, 13l, 14k may be the same angles, for example, all 5°.

Therefore, the segmented cutting type tipped saw blade 1 enables a cutting process with a low cutting resistance, while still forming a smooth cut surface in the workpiece. Such an effect is found to be particularly improved as compared to the conventional products as evidenced by test results described in more detail below. Moreover, with this configuration, the sound pressure level of the sound generated during cutting may also be reduced. Further, each of the inclined surfaces can be easily ground, since each of the top bevel angles of the segmented cutting type tipped saw blade 1 is identical. More specifically, the setting of a grinding wheel when changing to a different angle or the distance between the grinding surface and inclined surfaces can be easily corrected by setting the grinding wheel at the top bevel angle.

The locations where the greatest cutting resistance is exerted on each of the tips by the workpiece may be the tip end 11e of the first ridge tip 11, the tip end 12e of the second ridge tip 12, the first end 13f of the first end tip 13, and the second end 14g of the second end tip 14. These generally correspond to the radially outwardly projected portion of each of the tips 11-14. The tip ends 11e, 12e of the first and second ridge tips 11, 12 as well as the first end 13f of the first end tip 13 and the second end 14g of the second end tip 14 may each be located at different locations in the thickness direction of the metal base 4. Therefore, the cutting resistance from the workpiece received by the segmented cutting type tipped saw blade 1 is dispersed mainly in four respectively different spots in the thickness direction of the metal base 4. This allows the vibration to be reduced in the thickness direction of the metal base 4 in the segmented cutting type tipped saw blade 1. Further, the smoothing of the cut surface of the workpiece and the reduction in the sound pressure level accompanied by cutting may be expected to reduce the vibration in the thickness direction of the metal base 4.

Hereinafter, another embodiment will be described with reference to FIGS. 4 to 6. A segmented cutting type tipped saw blade 2 according to this embodiment includes groups of tips 20 shown in FIGS. 4 and 5, alternative to the groups of tips 10 as shown in FIGS. 1 and 2. The groups of tips 20 in the second embodiment may be formed of 5 types of tips circumferentially aligned along the radially outer peripheral edge of the metal base 4. The 5 types of tips are a first ridge tip 21, a second ridge tip 22, a third ridge tip 23, a first end tip 24, and a second end tip 25. In the following description, the front of the rotation direction (the front in the clockwise direction of FIG. 4) of the segmented cutting type tipped saw blade 2 is set as the leading or front side of each of the tips. The circumferential ordering of the 5 types of the tips shall not be limited to the one shown in FIGS. 4 to 6.

Figure 5:
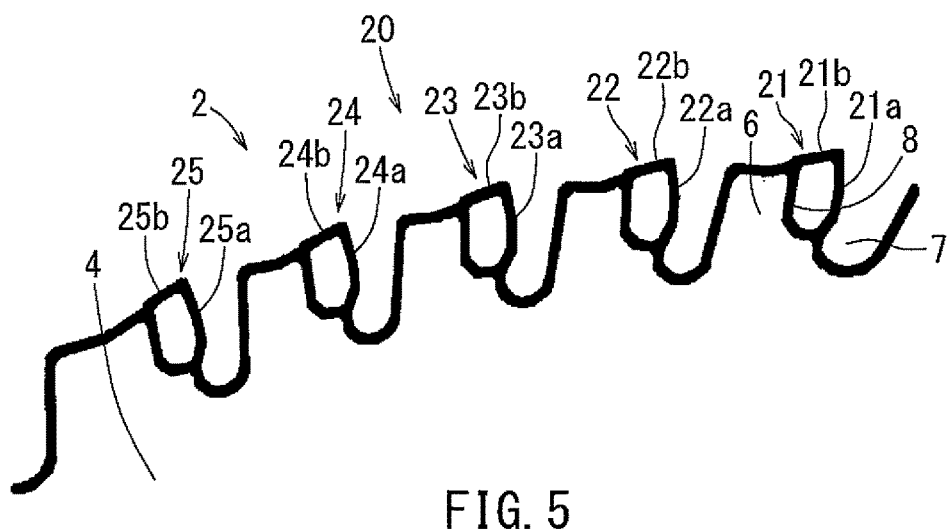
FIG. 5 is an enlarged, partial front view of the saw blade of FIG. 4 taken along a portion V in FIG. 4.

As shown in FIG. 5, the first ridge tip 21 also includes, similar to the first ridge tip 11, a rake face 21a and a flank 21b, which includes the first bevel surface 21c and the second bevel surface 21d. As shown in FIG. 6, the first ridge tip 21 includes a first end 21f and a second end 21g relative to the thickness direction. The first ridge tip 21 has a tooth thickness 21j of, for example, 1.1 mm. The first ridge tip 21 has a tip end 21e at a location between the first end 21f and the second end 21g. This tip end 21e is located at a position at substantially one half of the tooth thickness 21j from the first end 21f in the thickness direction (first location). The first ridge tip 21 has a first bevel surface 21c extending from the tip end 21e to the first end 21f and a second bevel surface 21d extending from the tip end 21e to the second end 21g. The first bevel surface 21c is inclined at a first top bevel angle 21k with respect to a virtual line 2a extending parallel to the central axis of the metal base 4 and through the tip end 21e. The second bevel surface 21d is inclined by a second top bevel angle 21l with respect to the virtual line 2a. The first top bevel angle 21k and the second top bevel angle 21l each may be greater than or equal to 3° and less than or equal to 10°, for example, 5°.

As shown in FIG. 5, the second ridge tip 22 also includes, similar to the first ridge tip 21, a rake face 22a and a flank 22b, which includes the first bevel surface 22c and the second bevel surface 22d. As shown in FIG. 6, the second ridge tip 22 includes a first end 22f and a second end 22g relative to the thickness direction. The second ridge tip 22 has a tooth thickness 22j of, for example, 1.1 mm. The second ridge tip 22 has a tip end 22e in a location between the first end 22f and the second end 22g. The tip end 22e may be located at a position at substantially one quarter of the tooth thickness 22j from the first end 22f in the thickness direction (second location). The second ridge tip 22 includes a first bevel surface 22c extending from the tip end 22e to the first end 22f and a second bevel surface 22d extending from the tip end 22e to the second end 22g. The first bevel surface 22c is inclined by a first top bevel angle 22k with respect to the virtual line 2a. The second bevel surface 22d is inclined by a second top bevel angle 22l with respect to the virtual line 2a. The first top bevel angle 22k and the second top bevel angle 22l each may be greater than or equal to 3° and less than or equal to 10°, for example 5°.

As shown in FIG. 5, the third ridge tip 23 also includes, similar to the first ridge tip 21, a rake face 23a and a flank 23b, which includes the first bevel surface 23c and the second bevel surface 23d. As shown in FIG. 6, the third ridge tip 23 includes a first end 23f and a second end 23g relative to the thickness direction. The third ridge tip 23 has a tooth thickness 23j of, for example, 1.1 mm. The third ridge tip 23 has a tip end 23e in a location between the first end 23f and the second end 23g. This tip end 23e is located at a position at substantially one quarter of the tooth thickness 23j from the second end 23g in the thickness direction (third location). The third ridge tip 23 includes a first bevel surface 23c extending from the tip end 23e to the first end 23f and a second bevel surface 23d extending from the tip end 23e to the second end 23g. The first bevel surface 23c is inclined by a first top bevel angle 23k with respect to the virtual line 2a. The second bevel surface 23d is inclined by a second top bevel angle 23*l* with respect to the virtual line 2*a*. The first top bevel angle 23*k* and the second top bevel angle 23*l* each may be greater than or equal to 3° and less than or equal to 10°, for example 5°.

As shown in FIG. 5, the first end tip 24 also includes, similar to the first ridge tip 21, a rake face 24*a* and a flank 24*b*, which includes a top bevel surface 24*c*. As shown in FIG. 6, the first end tip 24 includes a first end 24*f* and a second end 24*g* relative to the thickness direction. The first end tip 24 has a tooth thickness 24*j* of, for example, 1.1 mm. The first end tip 24 has a top bevel surface 24*c* extending from the first end 24*f* to the second end 24*g*. The top bevel surface 24*c* may be inclined by a top bevel angle 24*l* with respect to the virtual line 2*a*. The top bevel angle 24*l* may be greater than or equal to 3° and less than or equal to 10°, for example, 5°.

As shown in FIG. 5, the second end tip 25 also includes, similar to the first ridge tip 21, a rake face 25*a* and a flank 25*b*, which includes a top bevel surface 25*c*. As shown in FIG. 6, the second end tip 25 includes a first end 25*f* and a second end 25*g* relative to the thickness direction. The second end tip 25 has a tooth thickness 25*j* of, for example, 1.1 mm. The second end tip 25 has a top bevel surface 25*c* extending from the second end 25*g* to the first end 25*f*. The top bevel surface 25*c* may be inclined by a top bevel angle 25*k* with respect to the virtual line 2*a*. The top bevel angle 25*k* may be greater than or equal to 3° and less than or equal to 10°, for example, 5°.

Figure 6:
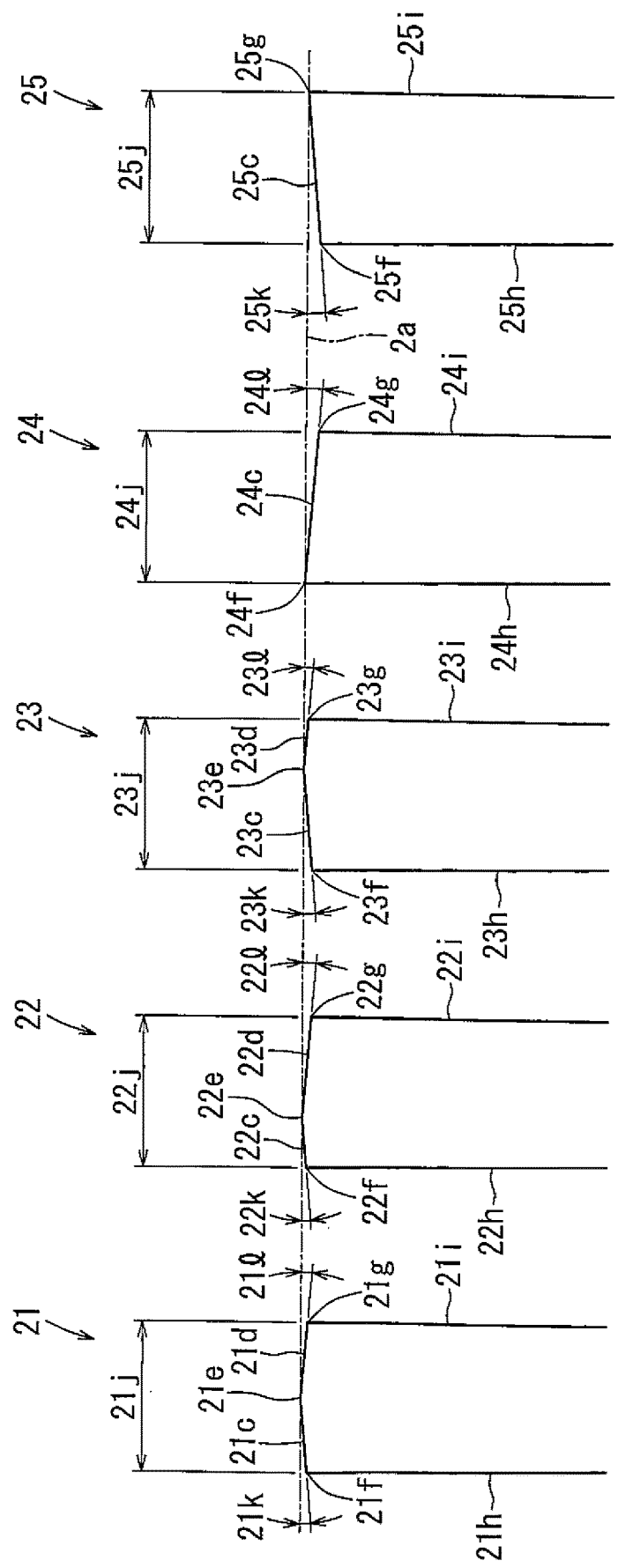
FIG. 6 is an end view in the circumferential direction of the tooth profiles of the tips for the segmented cutting type tipped saw blade of FIG. 4 with five segments.

As shown in FIG. 6, the first ridge tip 21 also includes, similar to the first ridge tip 11 shown in FIG. 3, a first side end face 21*h* and a second side end face 21*i*. Similarly, the second ridge tip 22 includes a first side end face 22*h* and a second side end face 22*i*. The third ridge tip 23 includes a first side end face 23*h* and a second side end face 23*i*. The first end tip 24 includes a first side end face 24*h* and a second side end face 24*i*. The second end tip 25 includes a first side end face 25*h* and a second side end face 25*i*. The first side end faces 21*h*, 22*h*, 23*h*, 24*h*, 25*h* and the second side end face 21*i*, 22*i*, 23*i*, 24*i*, 25*i* each may be inclined by an angle greater than 0° and less than or equal to 1° with respect to the radial direction of the metal base 4. For example, each inclination angle may be closer to the inside of 30'.

Figure 4:
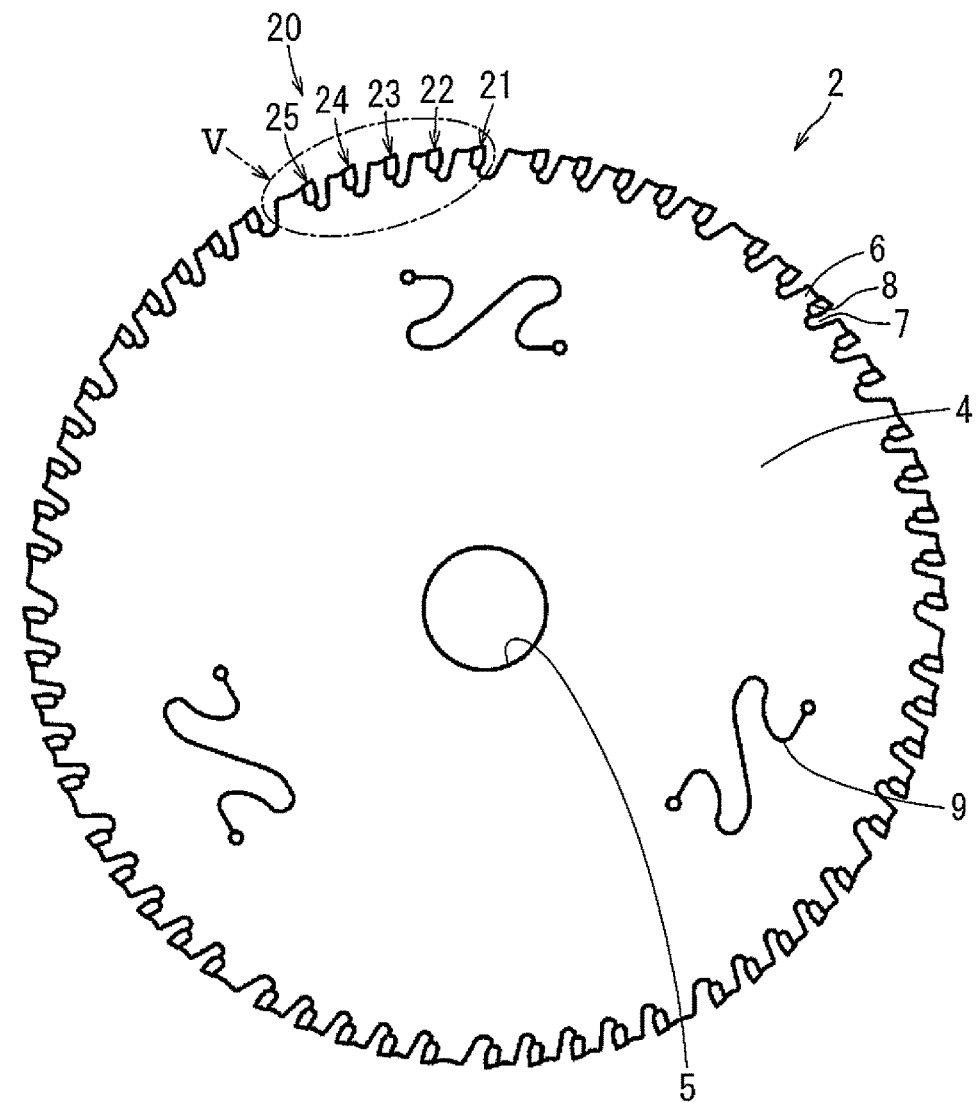
FIG. 4 is a front view of an embodiment of a segmented cutting type tipped saw blade with five segments in accordance with the principles described herein.

As shown in FIGS. 4 and 6, the segmented cutting type tipped saw blade 2 may have five types of tips, such as the first ridge tip 21, the second ridge tip 22, the third ridge tip 23, the first end tip 24, and the second end tip 25. The first end tip 24 may have a first end 24*f* projecting radially outward, and the second end tip 25 may have a second end 25*g* projecting radially outward. The first ridge tip 21 includes a tip end 21*e* projecting radially outward in a location at substantially one half of the tooth thickness 21*j* from the first end 21*f* in the thickness direction. The second ridge tip 22 includes a tip end 22*e* projecting radially outward in a location at substantially one quarter of the tooth thickness 22*j* from the first end 22*f* in the thickness direction. The third ridge tip 23 includes a tip end 23*e* projecting radially outward in a location at substantially one quarter of the tooth thickness 23*j* from the second end 23*g* in the thickness direction.

As shown in FIG. 6, the top bevel angle 24*l* of the top bevel surface 24*c*, the top bevel angle 25*k* of the top bevel surface 25*c*, the first top bevel angle 21*k* of the first bevel surface 21*c*, the second top bevel angle 21*l* of the second bevel surface 21*d*, the first top bevel angle 22*k* of the first bevel surface 22*c*, the second top bevel angle 22*l* of the second inclined angle 22*d*, the first top bevel angle 23*k* of the first bevel surface 23*c*, and the second top bevel angle 23*l* of the second bevel surface 23*d* with respect to the virtual line 2*a* each may be greater than or equal to 3° and less than or equal to 10°, for example, 5°. Preferably, all of these angles may be the same angle, for example, all 5°.

Therefore, the segmented cutting type tipped saw blade 2 as shown in FIG. 4 causes a similar effect as the segmented cutting type tipped saw blade 1 shown in FIG. 1. For example, the segmented cutting type tipped saw blade 2 shown in FIG. 4 enables a cutting process with a small cutting resistance, while still forming a smooth cut surface in the workpiece. Additionally, the sound pressure level of the sound generated during cutting may be reduced. Further, each of the inclined surfaces can be easily ground with the segmented cutting type tipped saw blade 2. In addition, with the segmented cutting type tipped saw blade 2, vibration in the thickness direction of the metal base 4 may easily be suppressed. Due to this effect, smoothing of a cut surface of the workpiece and a reduction in the sound pressure level accompanied by cutting may be expected.

Hereinafter, another embodiment will be described with reference to FIGS. 7 to 9. A segmented cutting type tipped saw blade 3 according to this embodiment includes the groups of tips 30 shown in FIGS. 7 and 8, alternative to the groups of tips 10 as shown in FIGS. 1 and 2. The groups of tips 30 may be formed of 6 types of tips aligned along the radially outer peripheral edge of the metal base 4. The 6 types of the tips are a first ridge tip 31, a second ridge tip 32, a third ridge tip 33, a fourth ridge tip 34, a first end tip 35, and a second end tip 36. In the following description, the front of the rotation direction (front in the clockwise direction of FIG. 7) of the segmented cutting type tipped saw blade 3 is set as the leading or front side of each of the tips. The circumferential order of the 6 types of the tips shall not be limited to that shown in FIGS. 7 to 9.

Figure 8:
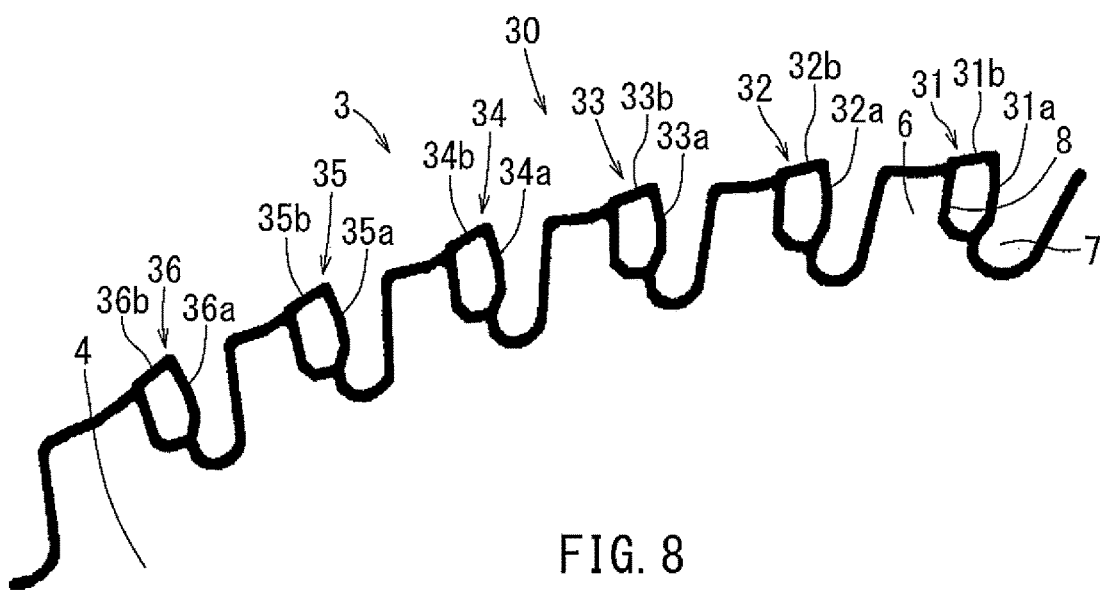
FIG. 8 is an enlarged, partial front view of the saw blade of FIG. 7 taken along a portion VIII in FIG. 7.

As shown in FIG. 8, the first ridge tip 31 also includes, similar to the first ridge tip 11 shown in FIG. 2, a rake face 31*a* and a flank 31*b*, which includes the first bevel surface 31*c* and the second bevel surface 31*d*. As shown in FIG. 9, the first ridge tip 31 includes a first end 31*f* and a second end 31*g* relative to the thickness direction. The first ridge tip 31 has a tooth thickness 31*j* of, for example, 1.1 mm. The first ridge tip 31 has a tip end 31*e* in a location between the first end 31*f* and the second end 31*g*. This tip end 31*e* is located in a position at substantially two fifths of the tooth thickness 31*j* from the first end 31*f* in the thickness direction (first location). The first ridge tip 31 has a first bevel surface 31*c* extending from the tip end 31*e* to the first end 31*f* and a second bevel surface 31*d* extending from the tip end 31*e* to the second end 31*g*. The first bevel surface 31*c* is inclined by a first top bevel angle 31*k* with respect to a virtual line 3*a* extending parallel to the central axis of the metal base 4 and through the tip end 31*e*. The second bevel surface 31*d* is inclined by a second top bevel angle 31*l* with respect to the virtual line 3*a*. The first top bevel angle 31*k* and the second top bevel angle 31*l* each may be greater than or equal to 3° and less than or equal to 10°, for example, 5°.

As shown in FIG. 8, the second ridge tip 32 also includes, similar to the first ridge tip 31, a rake face 32*a* and a flank 32*b*, which includes the first bevel surface 32*c* and the second bevel surface 32*d*. As shown in FIG. 9, the second ridge tip 32 includes a first end 32*f* and a second end 32*g* relative to the thickness direction. The second ridge tip 32 has a tooth thickness 32*j* of, for example, 1.1 mm. The second ridge tip 32 has a tip end 32*e* at a location between the first end 32*f* and the second end 32*g*. This tip end 32*e* is located in a position at substantially two fifths of the tooth thickness 32*j* from the second end 32*g* in the thickness direction (second location). The second ridge tip 32 has a first bevel surface 32c extending from the tip end 32e to the first end 32f and a second bevel surface 32d extending from the tip end 32e to the second end 32g. The first bevel surface 32c is inclined by a first top bevel angle 32k with respect to the virtual line 3a. The second bevel surface 32d is inclined by the second top bevel angle 32l with respect to the virtual line 3a. The first top bevel angle 32k and the second top bevel angle 32l each may be greater than or equal to 3° and less than or equal to 10°, for example, 5°.

As shown in FIG. 8, the third ridge tip 33 also includes, similar to the first ridge tip 31, a rake face 33a and a flank 33b, which includes the first bevel surface 33c and the second bevel surface 33d. As shown in FIG. 9, the third ridge tip 33 includes a first end 33f and a second end 33g relative to the thickness direction. The third ridge tip 33 has a tooth thickness 33j of, for example, 1.1 mm. The third ridge tip 33 has a tip end 33e at a location between the first end 33f and the second end 33g. This tip end 33e is located at a position at substantially one fifths of the tooth thickness 33j from the first end 33f in the thickness direction (third location). The third ridge tip 33 has a first bevel surface 33c extending from the tip end 33e to the first end 33f and a second bevel surface 33d extending from the tip end 33e to the second end 33g. The first bevel surface 33c is inclined by a first top bevel angle 33k with respect to a virtual line 3a. The second bevel surface 33d is inclined by a second top bevel angle 33l with respect to the virtual line 3a. The first top bevel angle 33k and the second top bevel angle 33l each may be greater than or equal to 3° and less than or equal to 10°, for example, 5°.

As shown in FIG. 8, the fourth ridge tip 34 also includes, similar to the first ridge tip 31, a rake face 34a and a flank 34b, which includes the first bevel surface 34c and the second bevel surface 34d. As shown in FIG. 9, the fourth ridge tip 34 includes a first end 34f and a second end 34g relative to the thickness direction. The fourth ridge tip 34 has a tooth thickness 34j of, for example, 1.1 mm. The fourth ridge tip 34 has a tip end 34e at a location between the first end 34f and the second end 34g. This tip end 34e is located at a position at substantially one fifths of the tooth thickness 34j from the second end 34g in the thickness direction (fourth location). The fourth ridge tip 34 has a first bevel surface 34c extending from the tip end 34e to the first end 34f and a second bevel surface 34d extending from the tip end 34e to the second end 34g. The first bevel surface 34c is inclined by a first top bevel angle 34k with respect to the virtual line 3a. The second bevel surface 34d is inclined by a second top bevel angle 34l with respect to the virtual line 3a. The first top bevel angle 34k and the second top bevel angle 34l each may be greater than or equal to 3° and less than or equal to 10°, for example, 5°.

As shown in FIG. 8, the first end tip 35 also includes, similar to the first ridge tip 31, a rake face 35a and a flank 35b, which includes a top bevel surface 35c. As shown in FIG. 9, the first end tip 35 includes a first end 35f and a second end 35g relative to the thickness direction. The first end tip 35 has a tooth thickness 35j of, for example, 1.1 mm. The first end tip 35 has a top bevel surface 35c extending from the first end 35f to the second end 35g. The top bevel surface 35c may be inclined by a top bevel angle 35l with respect to the virtual line 3a. The top bevel angle 35l may be greater than or equal to 3° and less than or equal to 10°, for example, 5°.

As shown in FIG. 8, the second end tip 36 also includes, similar to the first ridge tip 31, a rake face 36a and a flank 36b, which includes a top bevel surface 36c. As shown in FIG. 9, the second end tip 36 includes a first end 36f and a second end 36g relative to the thickness direction. The second end tip 36 has a tooth thickness 36j of, for example, 1.1 mm. The second end tip 36 has a top bevel surface 36c extending from the second end 36g to the first end 36f. The top bevel surface 36c may be inclined by a top bevel angle 36k with respect to the virtual line 3a. The top bevel angle 36k may be greater than or equal to 3° and less than or equal to 10°, for example, 5°.

Figure 9:
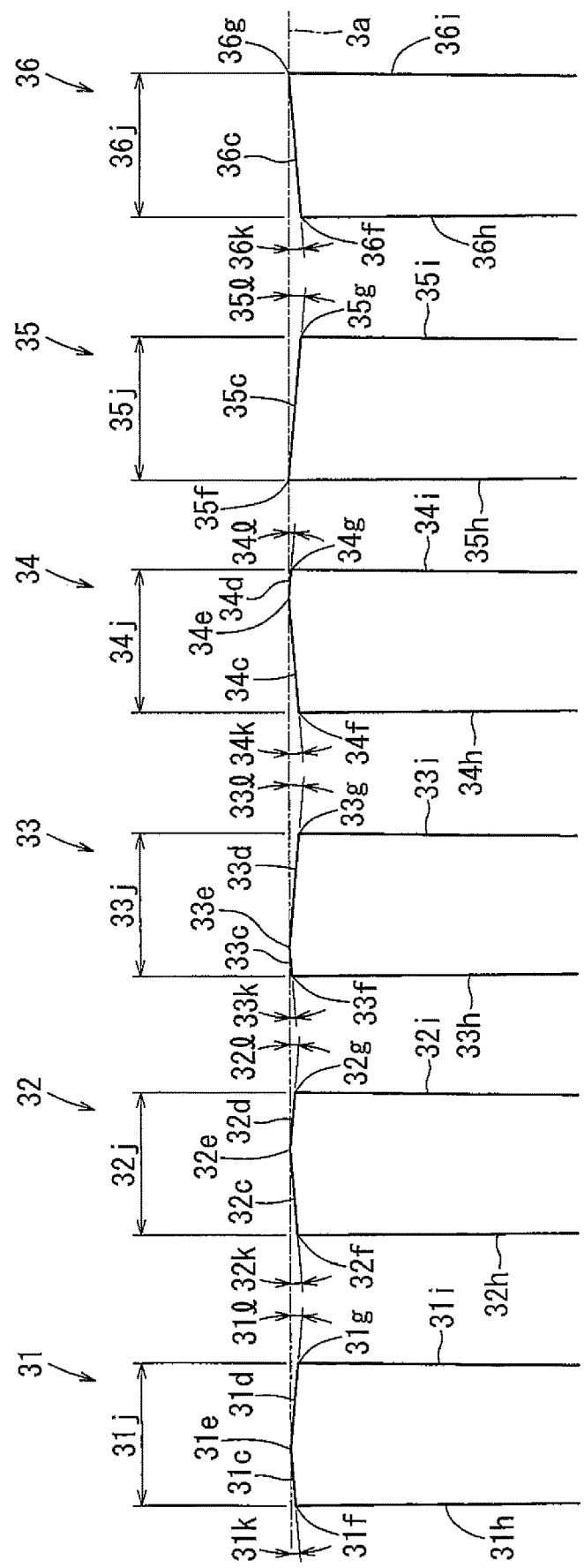
FIG. 9 is an end view in a circumferential direction of the tooth profiles of each of the tips for the segmented cutting type tipped saw blade of FIG. 7 with six segments.

As shown in FIG. 9, the first ridge tip 31 also includes, similar to the first ridge tip 11 shown in FIG. 3, a first side end face 31h and a second side end face 31i. Similarly, the second ridge tip 32 includes a first side end face 32h and a second side end face 32i. The third ridge tip 33 includes a first side end face 33h and a second side end face 33i. The fourth ridge tip 34 includes a first side end face 34h and a second side end face 34i. The first end tip 35 include a first side end face 35h and a second side end face 35i. The second end tip 36 include a first side end face 36h and a second side end face 36i. The first side end faces 31h, 32h, 33h, 34h, 35h, 36h and the second side end faces 31i, 32i, 33i, 34i, 35i, 36i each may be inclined by an angle greater than 0° and less than or equal to 1° with respect to the radial direction of the metal base 4. For example, each inclination angle may be closer to the inside of 30'.

Figure 7:
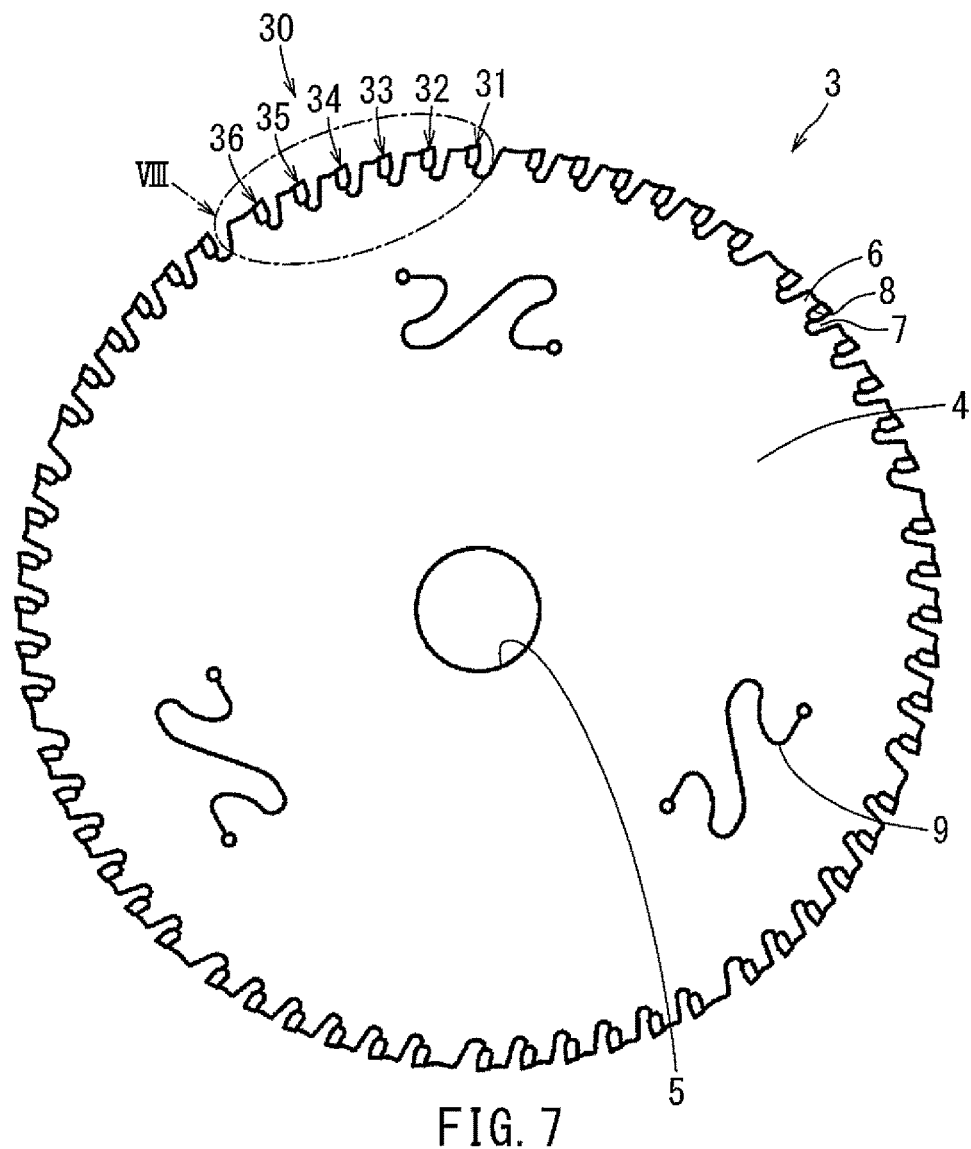
FIG. 7 is a front view of an embodiment of a segmented cutting type tipped saw blade with six segments in accordance with the principles described herein.

As shown in FIGS. 7 and 9, the segmented cutting type tipped saw blade 3 may have six types of tips, such as the first ridge tip 31, the second ridge tip 32, the third ridge tip 33, the fourth ridge tip 34, the first end tip 35, and the second end tip 36. The first end tip 35 may have a first end 35f projecting radially outward, and the second end tip 36 may have a second end 36g projecting radially outward. The first ridge tip 31 includes a tip end 31e projecting radially outward and in a location at substantially two fifth of the tooth thickness 31j from the first end 31f in the thickness direction. The second ridge tip 32 includes a tip end 32e projecting radially outward and in a location at substantially two fifth of the tooth thickness 32j from the second end 32g in the thickness direction. The third ridge tip 33 includes a tip end 33e projecting radially outward and in a location at substantially one fifth of the tooth thickness 33j from the first end 33f in the thickness direction. The fourth ridge tip 34 includes a tip end 34e projecting radially outward and in a location at substantially one fifth of the tooth thickness 34j from the second end 34g in the thickness direction.

As shown in FIG. 9, the top bevel angle 35l of the top bevel surface 35c, the top bevel angle 36k of the top bevel surface 36c, the first top bevel angle 31k of the first bevel surface 31c, the second top bevel angle 31l of the second bevel surface 31d, the first top bevel angle 32k of the first bevel surface 32c, the second top bevel angle 32l of the second inclined angle 32d, the first top bevel angle 33k of the first bevel surface 33c, the second top bevel angle 33l of the second bevel surface 33d, the first top bevel angle 34k of the first bevel surface 34c, and the second top bevel angle 34l of the second bevel surface 34d each may be greater than or equal to 3° and less than or equal to 10°, for example, 5°. Preferably, all of these angles may be the same angle, for example, all 5°.

Therefore, the segmented cutting type tipped saw blade 3 as shown in FIG. 7 causes a similar effect as the segmented cutting type tipped saw blade 1 shown in FIG. 1. For example, the segmented cutting type tipped saw blade 3 according to the present embodiment enables a cutting process with a small cutting resistance, while still forming a smooth cut surface in the workpiece. The sound pressure level of the sound generated during cutting may also be reduced. Further, each of the inclined surfaces can be easily ground with the segmented cutting type tipped saw blade 3. In addition, with the segmented cutting type tipped saw blade 3, vibration in the thickness direction of the metal base 4 may easily be suppressed. Due to this effect, smoothing of a cut surface of the workpiece and a reduction in the sound pressure level accompanied by cutting may be expected.

Hereinafter, comparative experiments and results regarding cutting by the segmented cutting type tipped saw blade according to the above-described embodiments and by a tipped saw blade having the same tips as a conventional product will be described. In some of the experiments, the cut surface of the workpiece after cutting, a cutting power transition, and noise during cutting were compared. Test products were tipped saw blades all having an outer diameter of 305 mm, a tooth thickness of 2.5 mm, a body thickness (metal base thickness) of 2.2 mm, a mounting hole diameter of 25.4 mm, and a tooth count of 60. As the workpiece, a carbon steel pipe material for mechanical structure (STKM11A) having an outer diameter of 31.8 mm and thickness of 1.6 mm was used. Cutting was performed under up-cutting conditions with a rotation speed of 1485 rpm, a feed rate of 1.0 m/min, and a saw blade projection of 50 mm.

Figure 10:
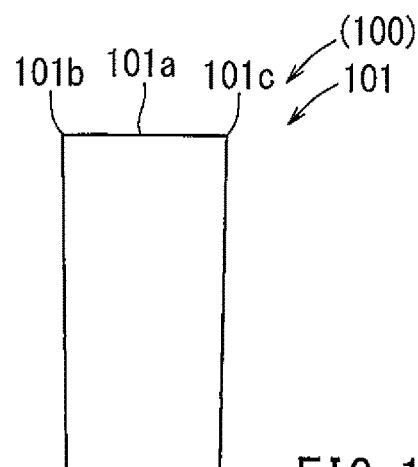
FIG. 10 is an end view in the circumferential direction of a tooth profile of a flat tooth tip having a flat tooth shape.

As shown in FIG. 10, a test product 100 includes a single type of tooth having a flat tooth tip 101. The flat tooth tip 101 has a tip end surface 101a, inclined by a top bevel angle of 0°, the angle being between a first end 101b in a tip end position on the left end in the drawing and a second end 101c in the tip end position on the right end in the drawing.

Figure 11:
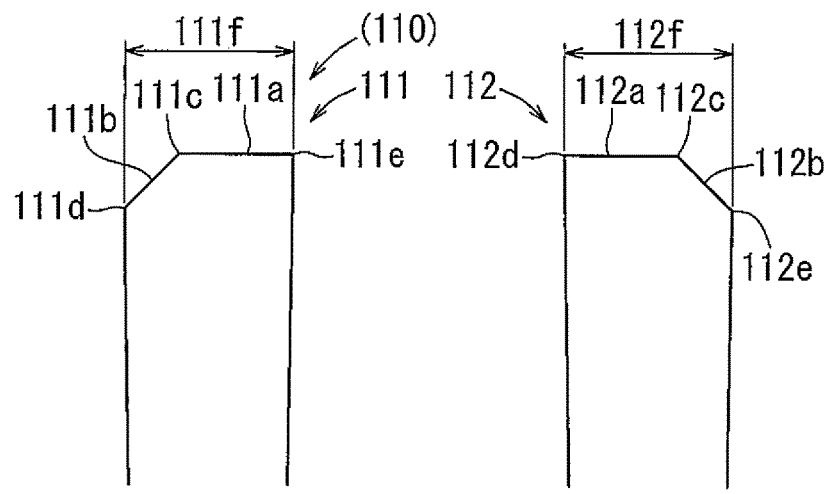
FIG. 11 illustrates end views in circumferential directions of a tooth profile of a first chamfered tip having a flat tooth shaped tip end and having an inclined surface on a first end side, and a tooth profile of a second chamfered tip having a flat tooth shaped tip end and having an inclined surface on a second end side.

As shown in FIG. 11, a test product 110 includes a first chamfered tip 111 and a second chamfered tip 112 alternately arranged in the circumferential direction along the peripheral edge of the metal base. The first chamfered tip 111 has a tip end face 111a and an inclined surface 111b. The tip end face 111a extends from the second end 111e to a corner 111c defined between the first end 111d and the second end 111e. The tip end face 111a is inclined by a top bevel angle of 0°. The corner 111c is located in a location at substantially one third of the tooth thickness 111f from the first end 111d in the thickness direction. The inclined surface 111b extends from the corner 111c to the first end 111d at a top bevel angle of 45°.

As shown in FIG. 11, the second chamfered tip 112 has a tip end face 112a and an inclined surface 112b. The tip end face 112a extends from the first end 112d to a corner 112c defined between the first end 112d and the second end 112e. The tip end face 112a is inclined by a top bevel angle of 0°. The corner 112c is located in a location at substantially one third of the tooth thickness 112f from the second end 112e in the thickness direction. The inclined surface 112b extends from the corner 112c to the second end 112e at a top bevel angle of 45°.

Figure 12:
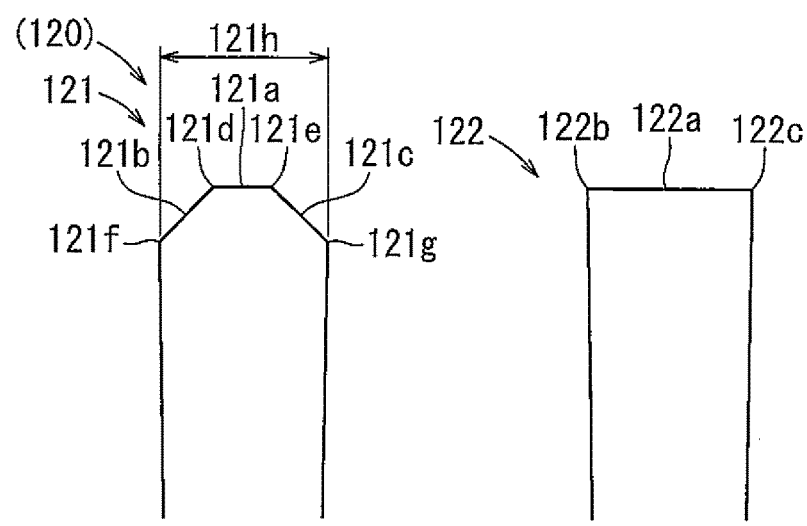
FIG. 12 illustrates end views in circumferential directions of a tooth profile of a triple tip having a flat tooth shaped tip end and having inclined surfaces on both the first end side and the second end side, and a tooth profile of a flat tooth tip.

As shown in FIG. 12, a test product 120 includes a triple tip 121 alternately circumferentially arranged around the peripheral edge of the metal base with a flat tooth tip 122. The flat tooth tip 122 includes a tip end face 122a, inclined by a top bevel angle of 0° between a first end 122b and a second end 122c.

As shown in FIG. 12, the triple tip 121 includes a tip end face 121a in the center area, and a first bevel surface 121b and a second bevel surface 121c on the both left and right sides. The tip end face 121a extends between a first corner 121d and a second corner 121e and is inclined by a top bevel angle of 0°. The first corner 121d is located in a location at substantially one third of the tooth thickness 121h from the first end 121f in the thickness direction. The second corner 121e is located in a location at substantially one third of the tooth thickness 121h from the second end 121g in the thickness direction. The first bevel surface 121b extends from the first corner 121d to the first end 121f by a top bevel angle of 45°. The second bevel surface 121d extends from the second corner 121e to the second end 121g at a top bevel angle of 45°. The tip end face 121a radially projects further than the tip end face 122a of the flat tooth tip 122.

Figure 13:
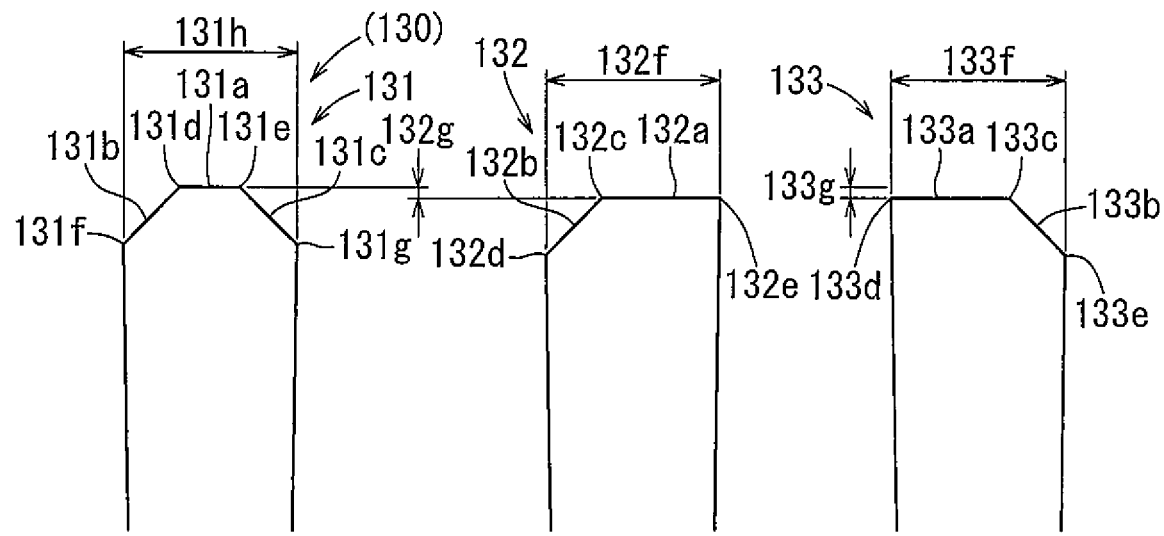
FIG. 13 illustrates end view in circumferential directions of tooth profiles of a triple tip, the first chamfered tip, and the second chamfered tip.

As shown in FIG. 13, a test product 130 includes a triple tip 131, a first chamfered tip 132, and a second chamfered tip 133 arranged around the peripheral edge of the metal base, in order, in the circumferential direction. The triple tip 131 includes a tip end face 131a in the center area, and a first bevel surface 131b and a second bevel surface 131c on the both left and right sides, respectively. The tip end face 131a extends between the first corner 131d and the second corner 131e and is inclined by a top bevel angle of 0°. The first corner 131d is located in a location at substantially one third of the tooth thickness 131h from the first end 131f in the thickness direction. The second corner 131e is located in a location at substantially one third of the tooth thickness 131h from the second end 131g in the thickness direction. The first bevel surface 131b extends from the first corner 131d to the first end 131f by a top bevel angle of 45°. The second bevel surface 131c extends from the second corner 131e to the second end 131g by a top bevel angle of 45°.

As shown in FIG. 13, the first chamfered tip 132 includes a tip end face 132a and an inclined surface 132b. The tip end face 132a extends from the second end 132e to the corner 132c defined between the first end 132d and the second end 132e. The tip end face 132a is inclined by a top bevel angle of 0°. The tip end face 132a is positioned radially closer to the center of the metal base than the tip end face 131a of the triple tip 131 by a height difference 132g after being joined to the metal base. The height difference 132g may be, for example, 0.2 mm. The corner 132c is located in a location at substantially one third of the tooth thickness 132f from the first end 132d in the thickness direction. The inclined surface 132b extends from the corner 132c to the first end 132d at a top bevel angle of 45°.

As shown in FIG. 13, the second chamfered tip 133 includes a tip end face 133a and an inclined surface 133b. The tip end face 133a extends from the first end 133d to the corner 133c located between the first end 133d and the second end 133e. The tip end face 133a is inclined by a top bevel angle of 0°. The tip end face 133a is located in a location radially closer to the center of the metal base than the tip end face 131a of the triple tip 131 by a height difference 133g after being joined to the metal base. The height difference 133g may be, for example, 0.2 mm. The corner 133c is located in a location at substantially one third of the tooth thickness 133f from the second end 133e in the thickness direction. The inclined surface 133b extends from the corner 133c to the second end 133e at a top bevel angle of 45°.

Figure 33:
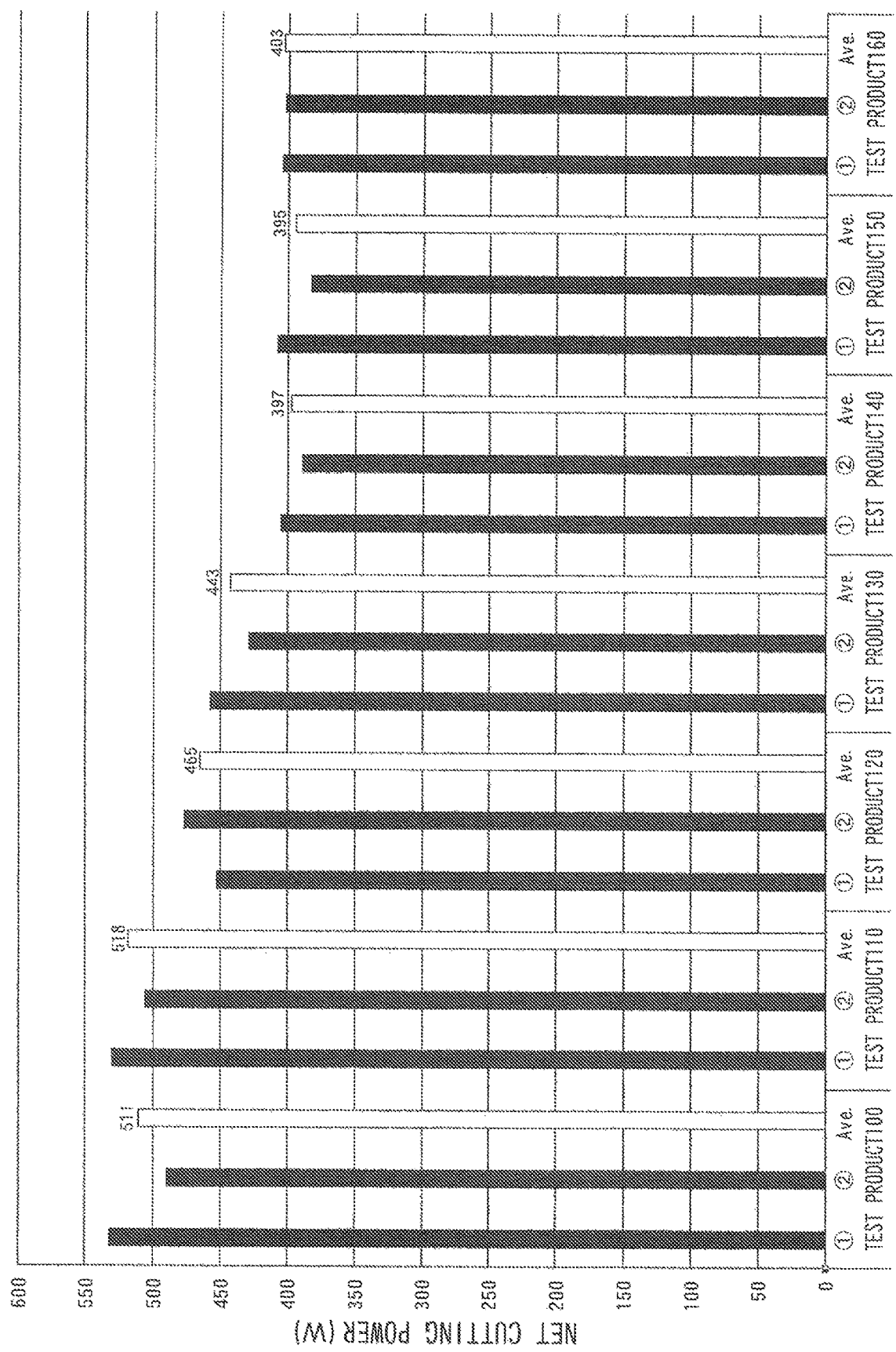
FIG. 33 is a graph illustrating a comparison of net cutting power when each of the tipped saw blades cuts a workpiece.

A test product 140 in FIG. 33 is a tipped saw blade of the embodiment having the tips shown in FIG. 3. The test product 140 includes a first ridge tip 11, a second ridge tip 12, a first end tip 13, and a second end tip 14 arranged around the peripheral edge of the metal base in the circumferential direction, as shown in FIG. 3. A test product 150 in FIG. 33 is a tipped saw blade of the embodiment having the tips shown in FIG. 6. The test product 150 includes a first ridge tip 21, a second ridge tip 22, a third ridge tip 23, a first end tip 24, and a second end tip 25 arranged around the peripheral edge of the metal base in the circumferential direction, as shown in FIG. 6.

Figure 14:
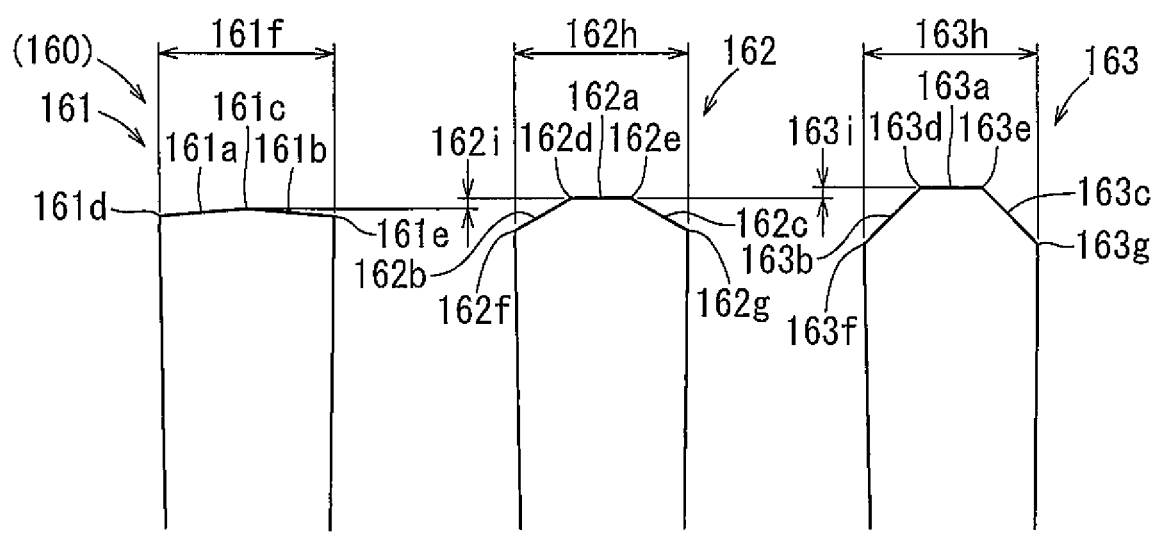
FIG. 14 illustrates end views in circumferential directions of tooth profiles of three types of tips having different top bevel angles.

As shown in FIG. 14, a test product 160 includes a first ridge tip 161, a first triple tip 162, and a second triple tip 163 arranged in order around the peripheral edge of the metal base in the circumferential direction. The ridge tip 161 includes a first bevel surface 161a and a second bevel surface 161b. The first bevel surface 161a extends from the tip end 161c between the first end 161d and the second end 161e to the first end 161d at a top bevel angle of 5°. The tip end 161c is located in a location at substantially one half of the tooth thickness 161f from the first end 161d in the thickness direction. The second bevel surface 161b extends from the tip end 161c to the second end 161e at the top bevel angle of 5°.

As shown in FIG. 14, the first triple tip 162 includes a tip end face 162a in the center area, and a first bevel surface 162b and a second bevel surface 162c on the both left and right sides, respectively. The tip end face 162a extends between a first corner 162d and a second corner 162e and is inclined by a top bevel angle of 0°. The tip end face 162a is positioned radially further outward than the tip end 161c of the ridge tip 131 by a height difference 162i after being joined to the metal base. The height difference 162i may be, for example, 0.2 mm. The first corner 161d is located in a location at substantially three tenths of the tooth thickness 162h from the first end 162f in the thickness direction. The second corner 162e is located in a location at substantially three tenths of the tooth thickness 162h from the second end 162g in the thickness direction. The first bevel surface 162b extends from the first corner 162d to the first end 162f at a top bevel angle of 30°. The second bevel surface 162d extends from the second corner 162e to the second end 162g at a top bevel angle of 30°.

As shown in FIG. 14, the second triple tip 163 includes a tip end face 163a in the center area, and a first bevel surface 163b and a second bevel surface 163c on the both left and right sides, respectively. The tip end face 163a extends between a first corner 163d and a second corner 163e and is inclined by a top bevel angle of 0°. The tip end face 163a is positioned further radially outward than the tip end face 162a of the first triple tip 162 by a height difference 163i after being joined to the metal base. The height difference 163i may be, for example, 0.2 mm. The first corner 163d is located in a location at substantially one third of the tooth thickness 163h from the first end 163f in the thickness direction. The second corner 163g is located in a location at substantially one third of the tooth thickness 163h from the second end 163g in the thickness direction. The first bevel surface 163b extends from the first corner 163d to the first end 163f at a top bevel angle of 45°. The second bevel surface 163c extends from the second corner 163e to the second end 163g at a top bevel angle of 45°.

Figure 15:
FIG. 15 is an enlarged, partial view of a cut surface of a workpiece cut by a tipped saw blade having the two types of tips of FIG. 12 alternately arranged.
Figure 16:
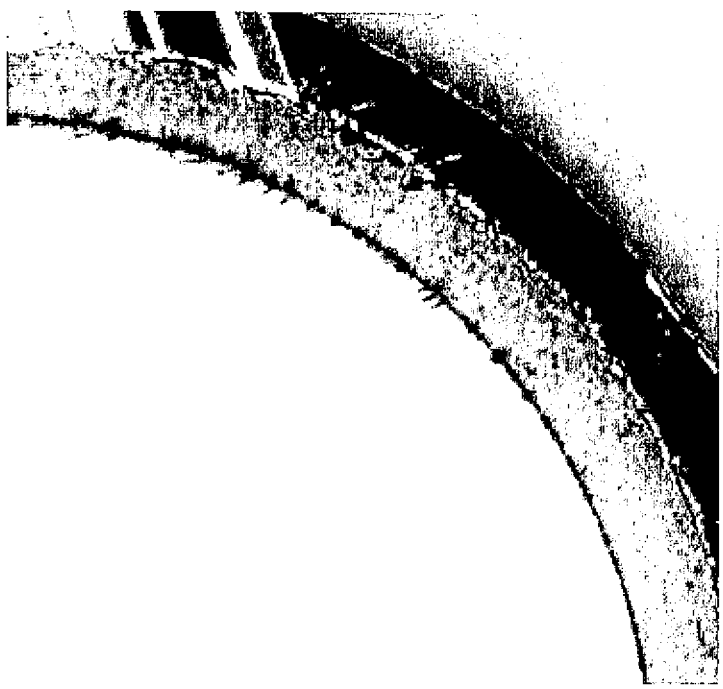
FIG. 16 is an enlarged, partial view of a cut surface of a workpiece cut by the segmented cutting type tipped saw blade with four segments.
Figure 17:
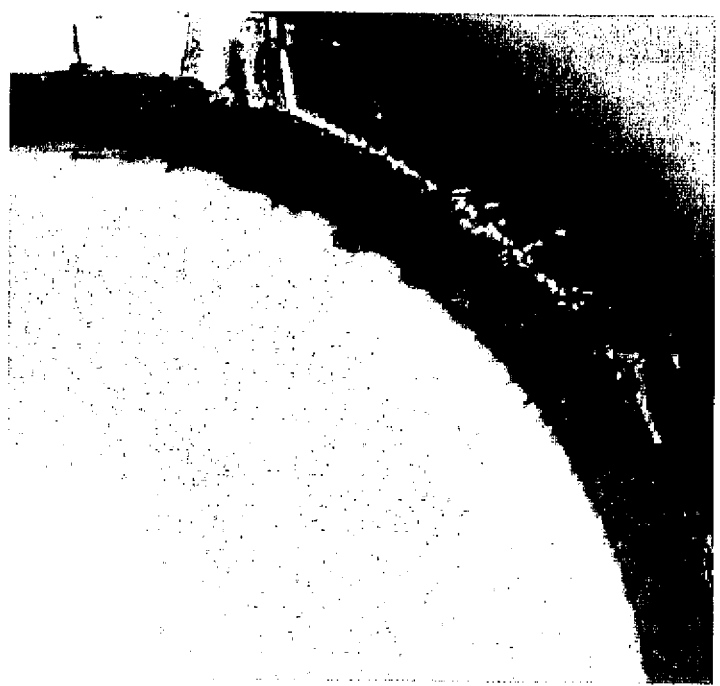
FIG. 17 is an enlarged, partial view of a cut surface of a workpiece cut by the segmented cutting type tipped saw blade with five segments.
Figure 18:
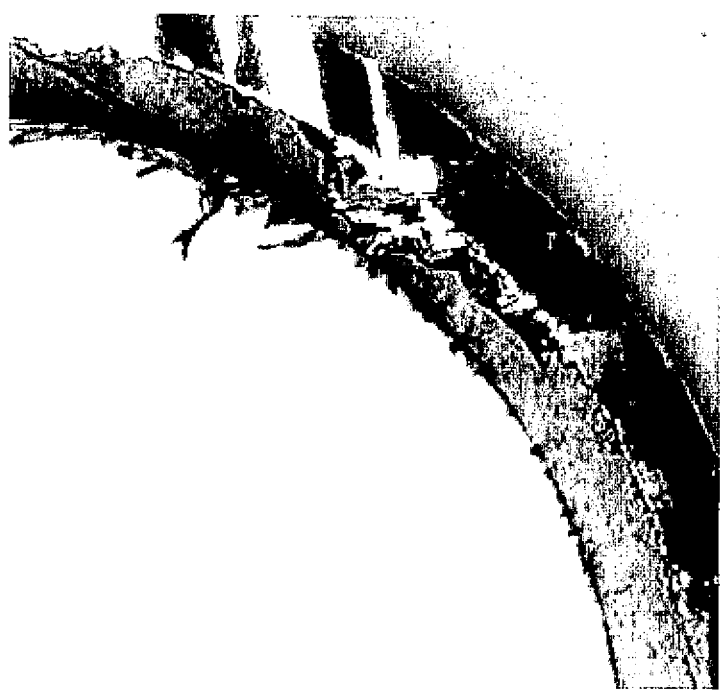
FIG. 18 is an enlarged, partial view of the cut surface of a workpiece cut by a tipped saw blade having the three types of tips (referred to as three top segments) of FIG. 14 arranged in order.

Cut surfaces of a workpiece cut by each of the test products will be compared with reference to FIGS. 15 to 18. FIG. 15 shows a cut surface of a workpiece cut with the test product 130 corresponding to a conventional product. FIGS. 16 and 17 show a cut surface of a workpiece cut with the test products 140, 150 according to the above described embodiments. FIG. 18 shows a cut surface of a workpiece cut with the test product 160 as a comparison object. No significant differences were observed among the cut surfaces cut with the test products 100, 110, 120, 130, corresponding to the conventional products, and the cut surfaces cut with the test products 140, 150 according to the embodiments. As shown in FIG. 18, a large burr was generated on the saw blade outlet side (inner peripheral side of the pipe in the figure) on the cut surface cut when using the test product 160 as the comparison object.

Figure 19:
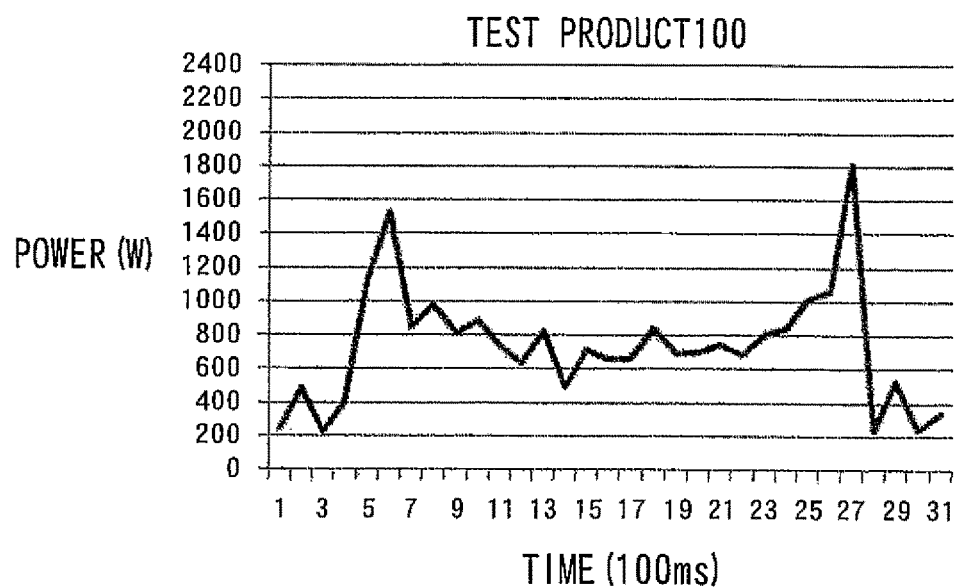
FIG. 19 is a graph illustrating the power transition when a tipped saw blade having the tips of FIG. 10 cuts a workpiece.
Figure 20:
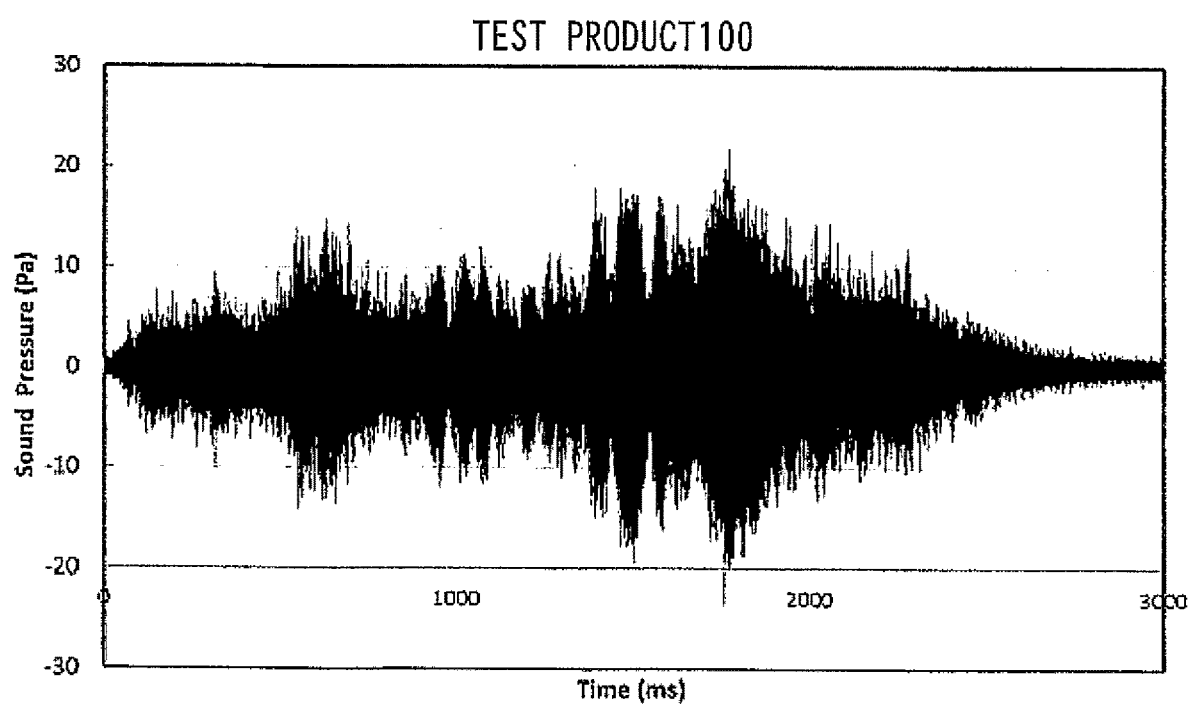
FIG. 20 is a graph illustrating the progression of sound pressure (also called instantaneous sound pressure) when the tipped saw blade having the tips of FIG. 10 cuts the workpiece.
Figure 21:
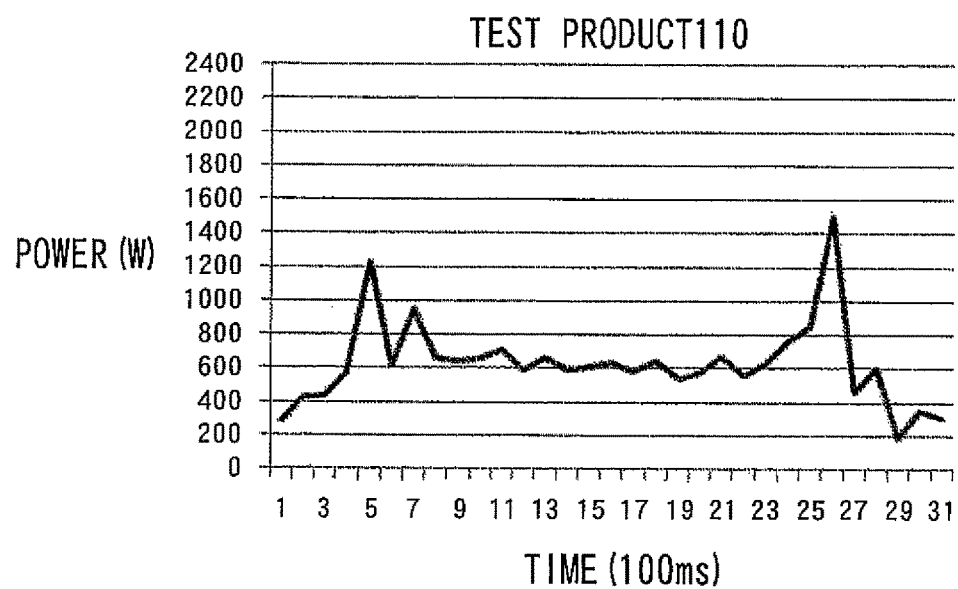
FIG. 21 is a graph illustrating the power transition when a tipped saw blade with the two types of tips of FIG. 11 alternately arranged cuts a workpiece.
Figure 22:
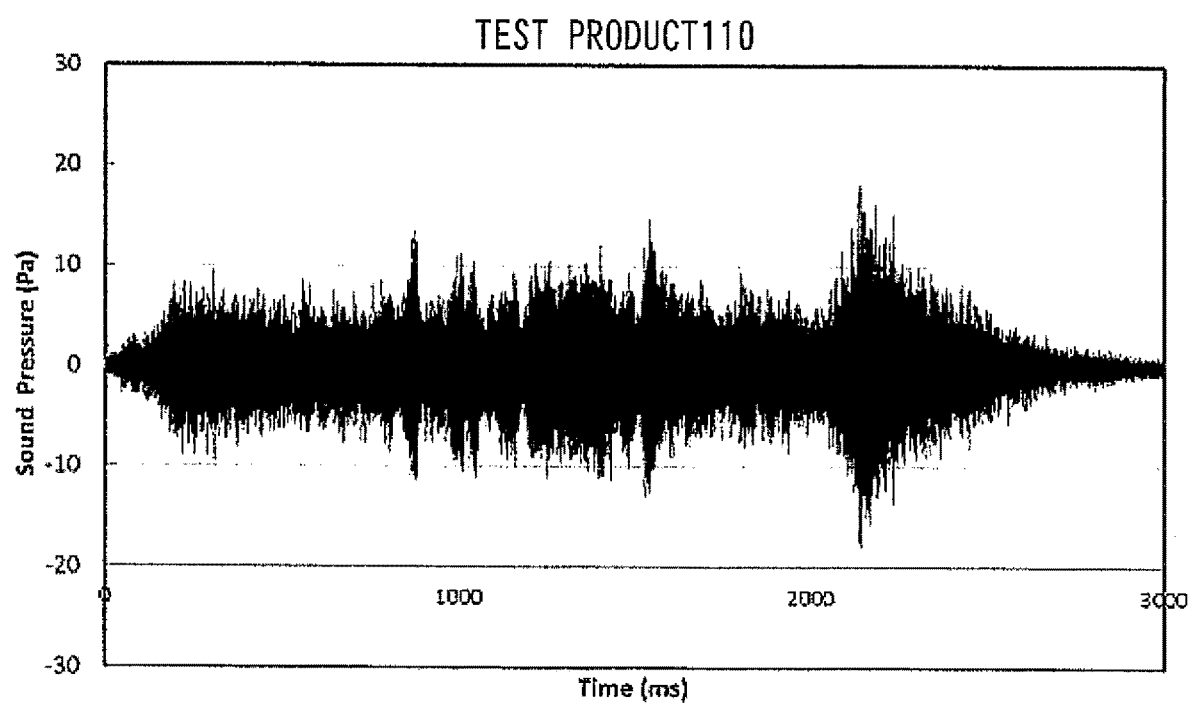
FIG. 22 is a graph illustrating the progression of sound pressure when the tipped saw blade with the two types of tips of FIG. 11 alternately arranged cuts the workpiece.
Figure 23:
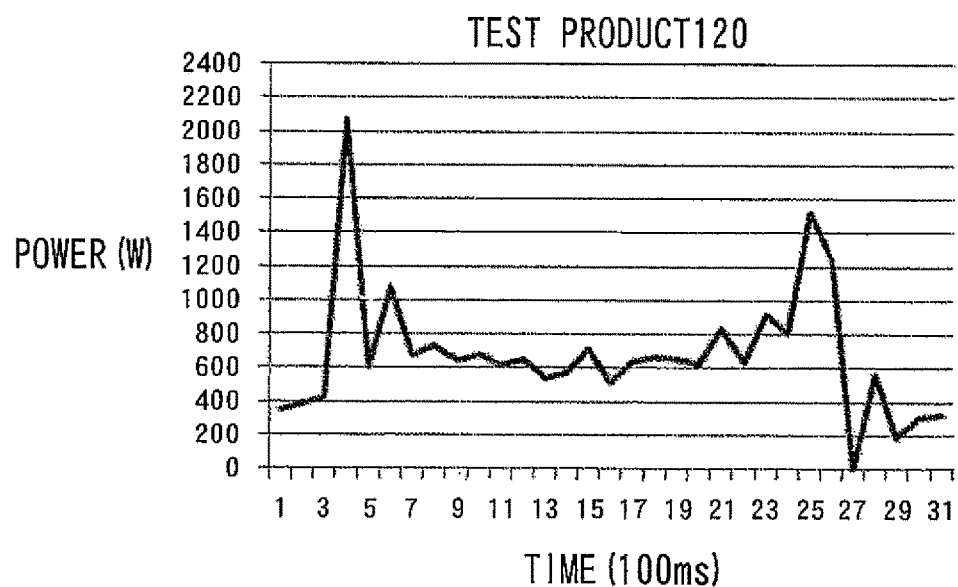
FIG. 23 is a graph illustrating the power transition when a tipped saw blade with the two types of tips of FIG. 12 alternately arranged cuts a workpiece.
Figure 24:
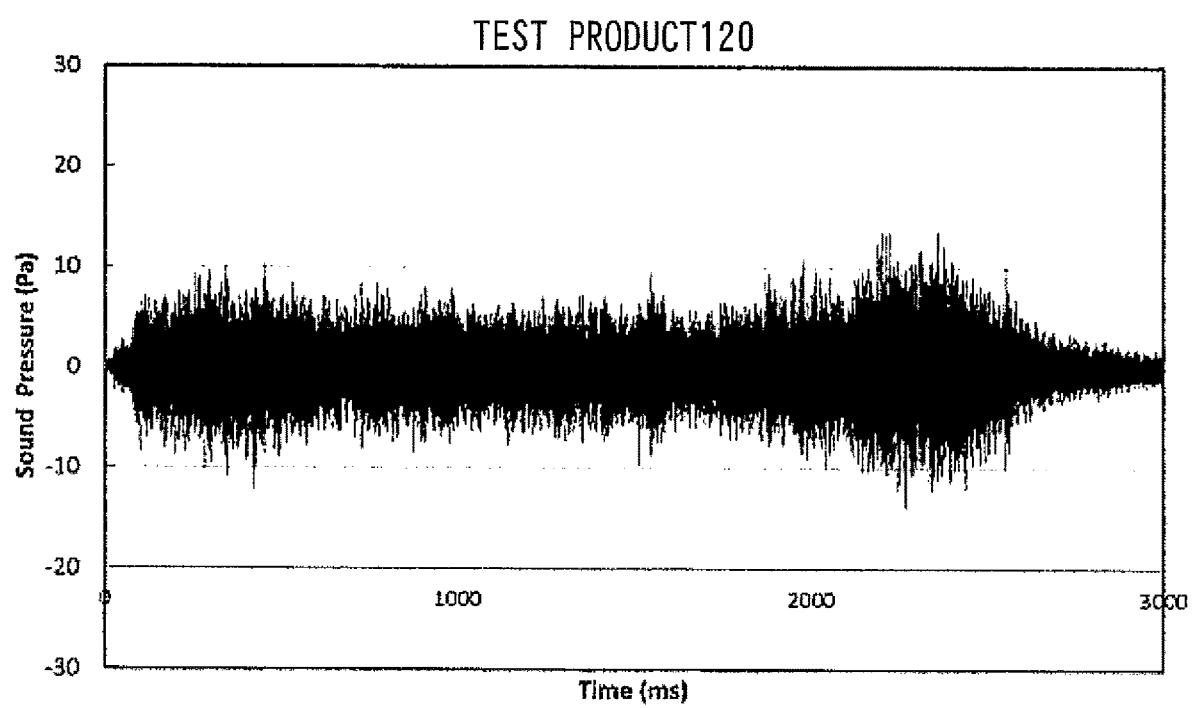
FIG. 24 is a graph illustrating the progression of sound pressure when the tipped saw blade with the two types of tips of FIG. 12 alternately arranged cuts the workpiece.
Figure 25:
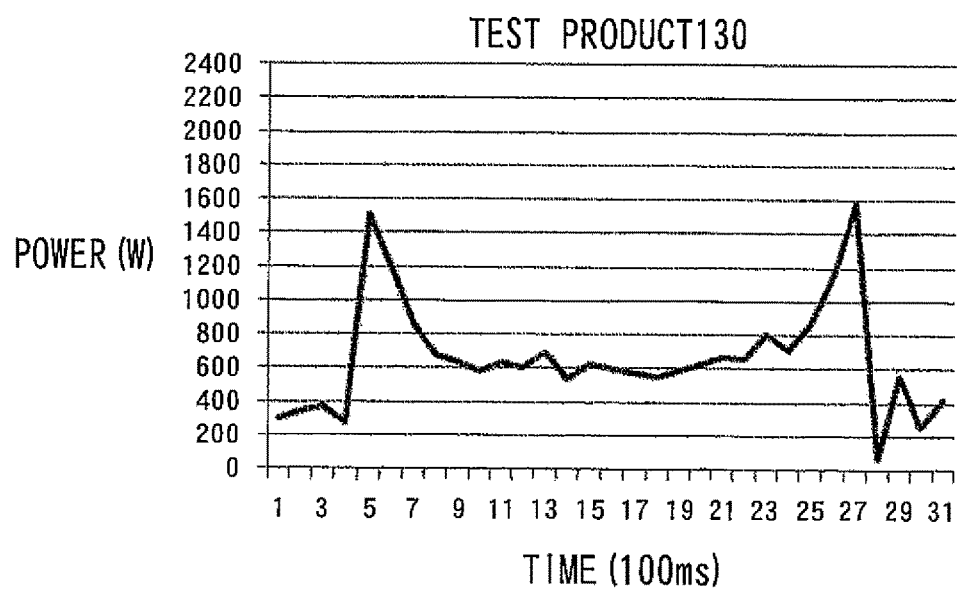
FIG. 25 is a graph illustrating the power transition when a tipped saw blade with the three types of tips of FIG. 13 arranged in order cuts a workpiece.
Figure 26:
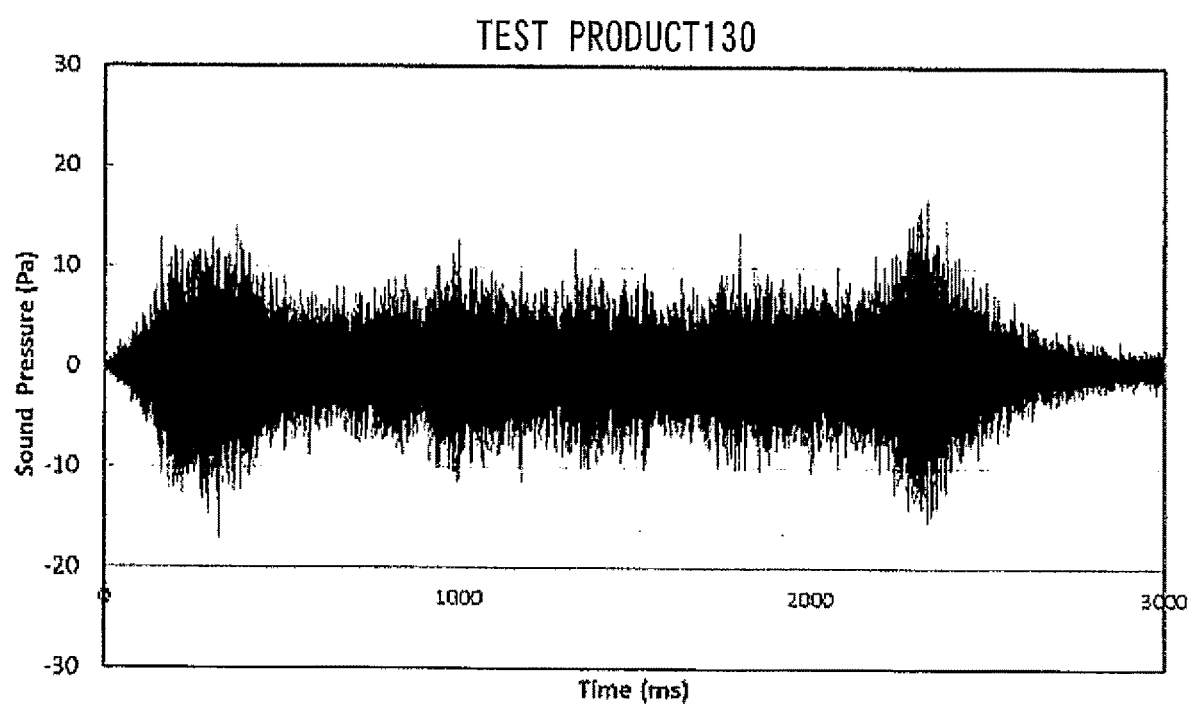
FIG. 26 is a graph illustrating the progression of sound pressure when the tipped saw blade with the three types of tips of FIG. 13 arranged in order cuts the workpiece.
Figure 27:
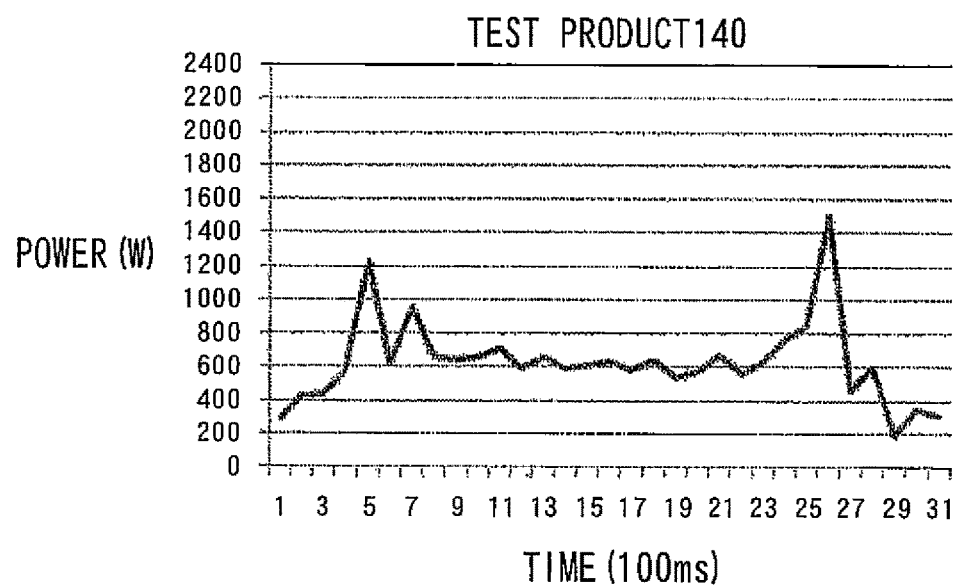
FIG. 27 is a graph illustrating the power transition when a segmented cutting type tipped saw blade with four segments cuts a workpiece.
Figure 28:
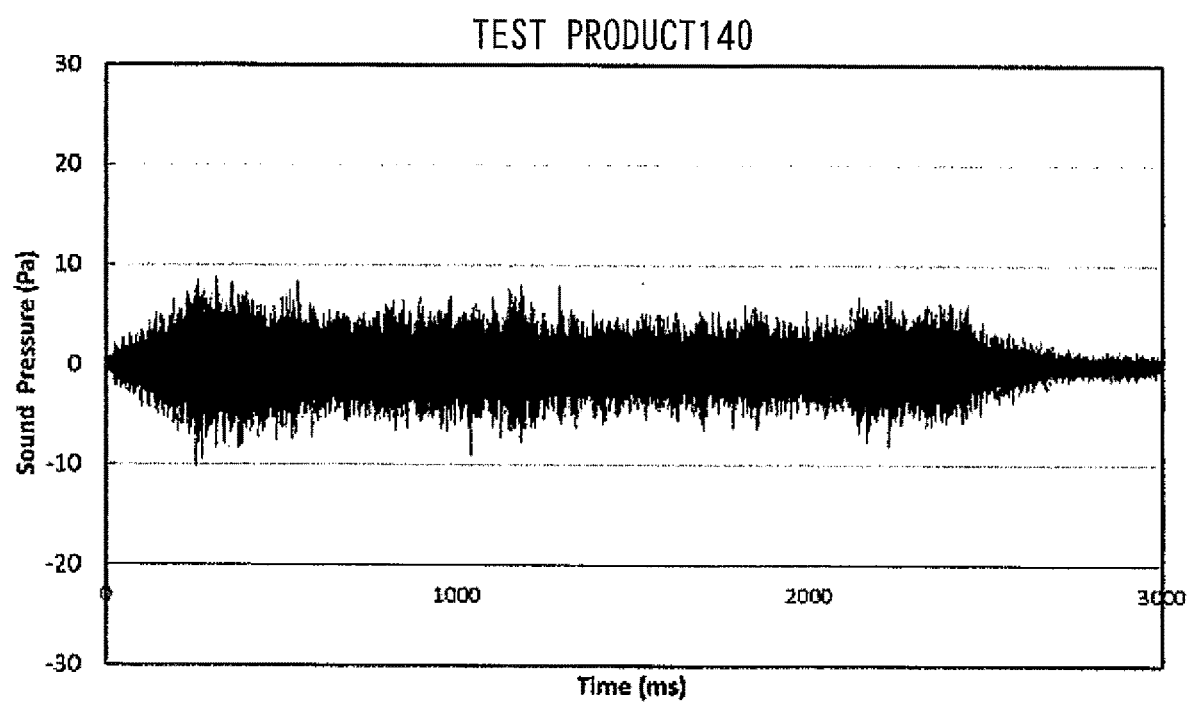
FIG. 28 is a graph illustrating the progression of sound pressure when the segmented cutting type tipped saw blade with the four segments cuts the workpiece.
Figure 29:
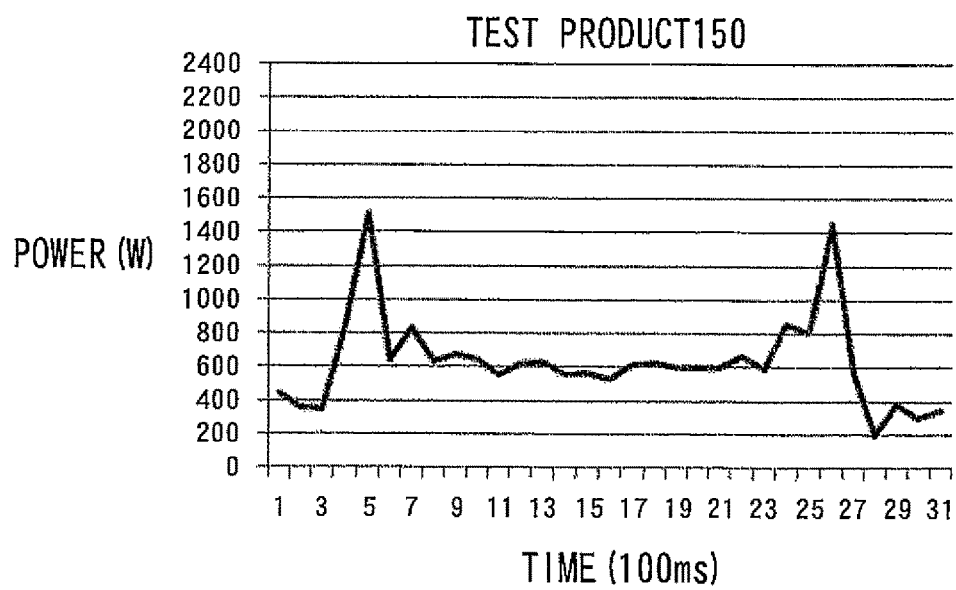
FIG. 29 is a graph illustrating the power transition when a segmented cutting type tipped saw blade with five segments cuts a workpiece.
Figure 30:
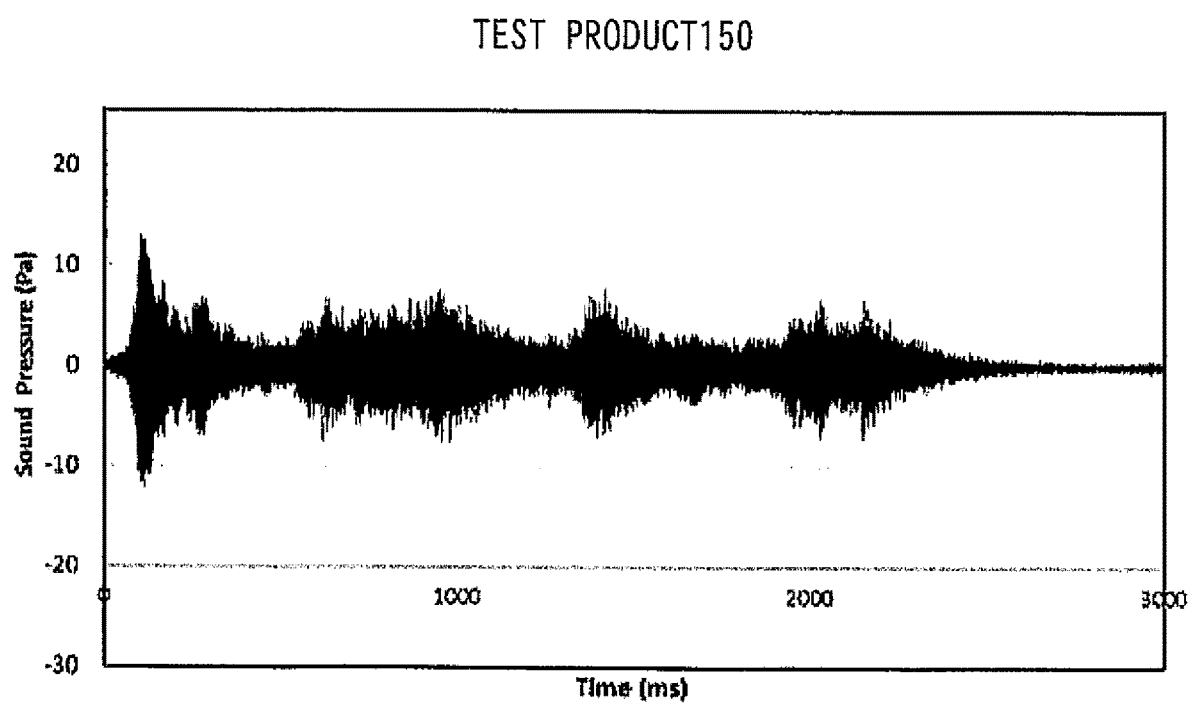
FIG. 30 is a graph illustrating the progression of sound pressure when the segmented cutting type tipped saw blade with the five segments cuts the workpiece.
Figure 31:
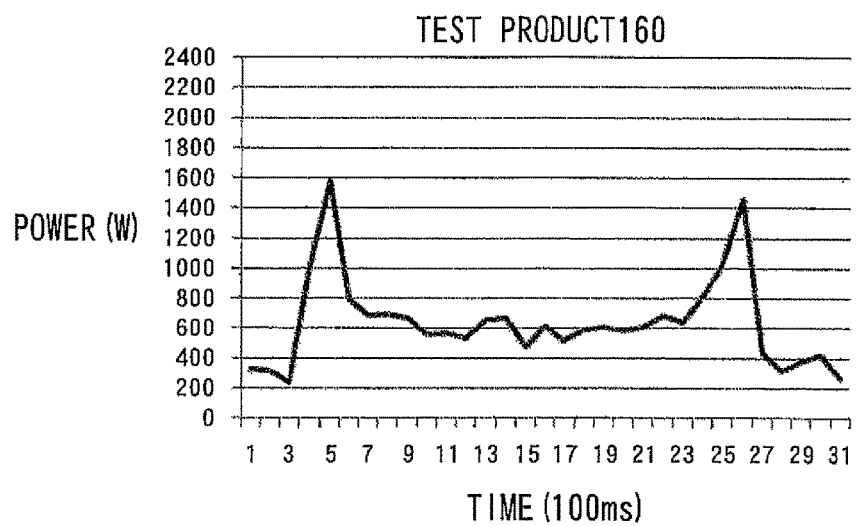
FIG. 31 is a graph illustrating the power transition when a segmented cutting type tipped saw blade with three top segments cuts a workpiece.
Figure 32:
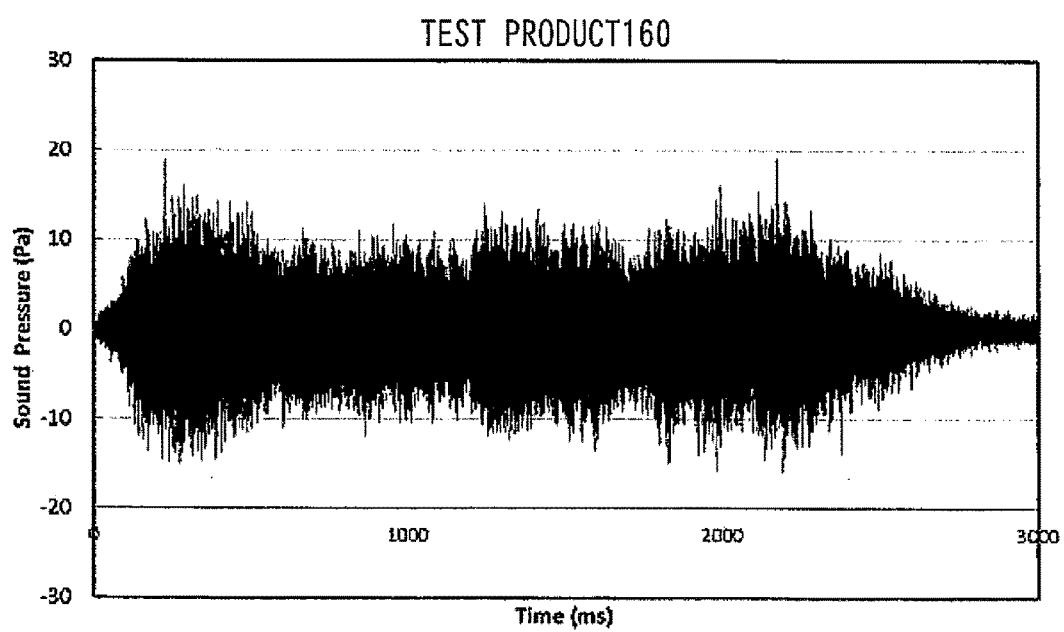
FIG. 32 is a graph illustrating the progression of sound pressure when the segmented cutting type tipped saw blade with the three top segments cuts the workpiece.

Power and noise during cutting of the workpiece with each of the test products were measured. FIGS. 19, 21, 23, 25, 27, 29 and 31 show the change in power during cutting of the workpiece. As shown in FIG. 19, etc., the beginning of cutting (left end of the figure) and the end of cutting (right end of the figure) represent the power at idling. Two peaks are present in the power transition since the pipe-shaped workpiece is cut perpendicular to the axial direction into a ring shape. More specifically, the peaks of the power appear at the beginning of cutting and almost the end of cutting. The power when cutting with the test products 140, 150 of the present embodiments had a smaller peak value and a smaller fluctuation in the range as compared to the other test products. Particularly, the net cutting power is significantly reduced when compared with the test product 100, which did not have an inclined surface. The net cutting power is also sufficiently reduced when compared with the other test products 110, 120, 130. The power transition of test product 160 was similar to that of test product 150.

FIGS. 20, 22, 24, 26, 28, 30 and 32 show the temporal change in the sound pressure in each of the test pieces. The sound pressure was measured with a sound level meter installed at a position approximately 1 m away from the cutting point. The sound pressure produced when cutting with the test products 140, 150 of the present embodiments were sufficiently lower than that of the other test products. The test product 140 had a particularly small fluctuation in sound pressure, and remained at a low sound pressure. The sound pressure of the test product 150 could be 2 Pa in some cases and the overall sound pressure could be suppressed. On the other hand, the test product 160, whose power transition was similar to that of the test product 150, generated relatively loud noise, with a sound pressure of greater than or equal to approximately 10 Pa.

The net cutting power of each of the test products was compared in FIGS. 33 to 35. The net cutting power is a value obtained by subtracting the idling power from the power transition of FIGS. 19, 21, 23, 25, 27, 29 and 31. Two tests were performed for each of the test products and their average values were compared. The solid black bars in FIG. 33 indicate the values obtained in the tests while blank white bars indicate the average values. As shown in FIG. 35, the net cutting power of the test products 140, 150 according to the present embodiments were 15 to 24% lower than that of the other test products 100, 110, 120. It should be appreciated that lower net cutting power means lower cutting resistance.

The noise generated during cutting each of the test products was compared in FIGS. 34 and 36. The degree of loudness in FIG. 34 corresponds to the noise perceived by humans, which is calculated by weighting the measured sound pressure level per each frequency. FIG. 36 indicates reduction rate of noise (loudness) of the test products 140, 150 according to the present embodiments with reference to the test products 100, 110, 120, respectively. As shown in FIG. 36, the reduction rate of noise of the test products 140, 150 were 13 to 19% compared to the other test products 100, 110, 120.

Subsequently, comparative experiments were performed with the segmented cutting type tipped saw blade having the respective numbers of segments of tips and the respective top bevel angles. The net cutting power, noise (loudness) generated during cutting, and A-characteristic sound pressure level (sound pressure level) were measured or calculated from the measured results when cutting the workpiece with the respective tipped saw blades. The net cutting power is obtained by subtracting the idling power from the actually measured cutting power. When the net cutting power is low, the cutting resistance is low.

The A-characteristic sound pressure level is a sound pressure level obtained by putting greater weight on the frequencies that are easy for humans to hear, with respect to the sound pressure level at the actually measured respective frequencies. In this test, an experimental machine equipped with a soundproof cover was used as an alternative to the experimental machine for the above described tests. The shape of the metal base, the number of teeth, and the cutting conditions of the test products are set to a tooth thickness of 2.2 mm and body thickness of 1.8 mm. The other conditions are the same as in the above test. The top bevel angle (first top bevel angle, second top bevel angle) of each of the tips of each test product is set to the same angle for the same test product. The tip end height (radial position with respect to the central axis of the metal base) of each tip of the test products is set to the same height.

The test products 200, 210, 220, 230, 240 in FIG. 39 have four segments and are provided with the first ridge tip 11, the second ridge tip 12, the first end tip 13, and the second end tip 14, as shown in FIG. 3, arranged in order around the radially outer peripheral edge of the metal base in the circumferential direction. The test products 250, 260, 270, 280, 290 have five segments and are provided with the first ridge tip 21, the second ridge tip 22, the third ridge tip 23, the first end tip 24, and the second end tip 25, as shown in FIG. 6. The test products 300, 310, 320, 330, 340 have six segments and are provided with the first ridge tip 31, the second ridge tip 32, the third ridge tip 33, the fourth ridge tip 34, the first end tip 35, and the second end tip 36, as shown in FIG. 9.

The respective top bevel angle of the respective tips of the test products 200, 250, 300 in FIG. 39 is 3°. The respective top bevel angle of the test products 210, 260, 310, 350, 360 is 5°. The respective top bevel angle of the test products 220, 270, 320 is 7°. The respective top bevel angle of the test products 230, 280, 330 is 10°. The respective top bevel angle of the test products 240, 290, 340 is 12°.

Figure 37:
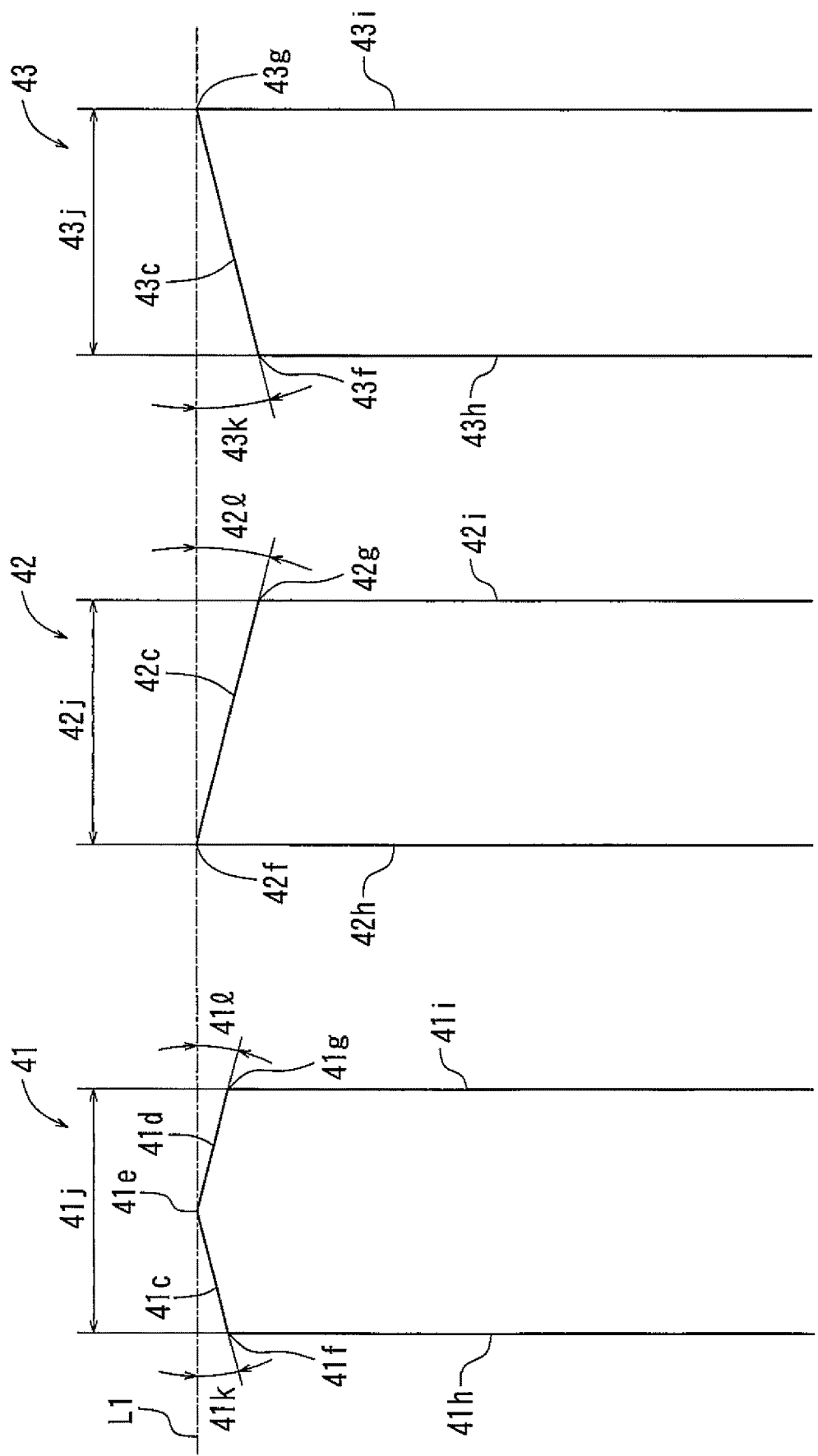
FIG. 37 is an end view in a circumferential direction illustrating tooth profiles of each of the tips for an embodiment of a segmented cutting type tipped saw blade with three segments in accordance with principles described herein, as seen from a circumferential direction.

The test product 350 in FIG. 39 has three segments and includes a ridge tip 41, a first end tip 42, and a second end tip 43 arranged in order around the radially outer peripheral edge of the metal base in the circumferential direction, as shown in FIG. 37. The ridge tip 41, the first end tip 42, and the second end tip 43 respectively include the first ends 41$f$, 42$f$, 43$f$ at the tip end positions on the left ends in the figure and the second ends 41$g$, 42$g$, 43$g$ at the tip end positions on the right ends in the figure. Each of the ridge tip 41, the first end tip 42, and the second end tip 43 has, for example, a tooth thickness 41$j$, 42$j$, 43$j$, respectively, of, for example, 2.2 mm.

As shown in FIG. 37, the ridge tip 41, the first end tip 42, and the second end tip 43 include a first side end faces 41$h$, 42$h$, 43$h$, respectively, extending radially inward of the metal base from the first ends 41$f$, 42$f$, 43$f$, respectively. The ridge tip 41, the first end tip 42, the second end tip 43 include a second side end faces 41$i$, 42$i$, 43$i$, respectively, extending similarly from the second ends 41$g$, 42$g$, 43$g$, respectively. The first side end faces 41$h$, 42$h$, 43$h$ and the second side end faces 41$i$, 42$i$, 43$i$ each are inclined by an inclination angle closer to the inside of 30' with respect to the radial direction of the metal base.

As shown in FIG. 37, the ridge tip 41 includes a tip end 41$e$ in a location at substantially one half of the tooth thickness 41$j$ from the first end 41$f$ in the thickness direction. The ridge tip 41 includes a first bevel surface 41$c$ extending from the tip end 41$e$ to the first end 41$f$ and a second bevel surface 41$d$ extending from the tip end 41$e$ to the second end 41$g$. The first bevel surface 41$c$ is inclined by a first top bevel angle 41$k$ with respect to a virtual line L1 extending parallel to the central axis of the metal base 4 and through the tip end 41$e$. The second bevel surface 41$d$ is inclined by a second top bevel angle 41$l$ with respect to the virtual line L1. The first top bevel angle 41$k$ and the second top bevel angle 41$l$ each may be 5°. The first end tip 42 may include a top bevel surface 42$c$ extending from the first end 42$f$ to the second end 42$g$. The top bevel surface 42$c$ is inclined by a top bevel angle 42$l$ of 5° with respect to the virtual line L1. The second end tip 43 may include a top bevel surface 43$c$ extending from the second end 43$g$ to the first end 43$f$. The top bevel surface 43$c$ is inclined by a top bevel angle 43$k$ of 5° with respect to the virtual line L1.

Figure 38:
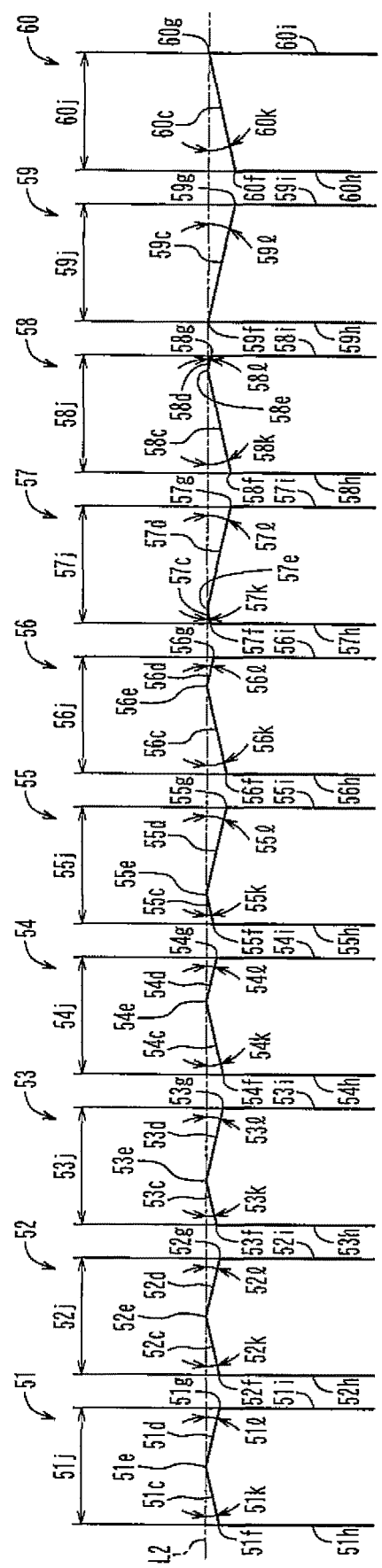
FIG. 38 is an end view in a circumferential direction illustrating tooth profiles of each of tips for an embodiment of a segmented cutting type tipped saw blade with ten segments in accordance with principles described herein.

The test product 360 with ten segments in FIG. 39 includes ridge tips 51 to 58, a first end tip 59, and a second end tip 60 arranged in order around the radially outer peripheral edge of the metal base in the circumferential direction as shown in FIG. 38. The ridge tips 51 to 58, the first end tip 59, and the second end tip 60 include first ends 51$f$, 52$f$, 53$f$, 54$f$, 55$f$, 56$f$, 57$f$, 58$f$, 59$f$, 60$f$, respectively, at the tip end positions on the left ends in the figure. The ridge tips 51 to 58, the first end tip 59, and the second end tip 60 include second ends 51$g$, 52$g$, 53$g$, 54$g$, 55$g$, 56$g$, 57$g$, 58$g$, 59$g$, 60$g$, respectively, at the tip end positions on the right ends in the figure. Each of the ridge tips 51 to 58, the first end tip 59, and the second end tip 60 has a tooth thickness 51$j$, 52$j$, 53$j$, 54$j$, 55$j$, 56$j$, 57$j$, 58$j$, 59$j$, 60$j$, respectively, of, for example, 2.2 mm.

As shown in FIG. 38, the ridge tips 51 to 58, the first end tip 59, and the second end tip 60 include a first side end faces 51$h$, 52$h$, 53$h$, 54$h$, 55$h$, 56$h$, 57$h$, 58$h$, 59$h$, 60$h$, respectively, extending radially inward of the metal base from the first ends 51$f$, 52$f$, 53$f$, 54$f$, 55$f$, 56$f$, 57$f$, 58$f$, 59$f$, 60$f$, respectively. The ridge tips 51 to 58, the first end tip 59, and the second end tip 60 include second side end faces 51$i$, 52$i$, 53$i$, 54$i$, 55$i$, 56$i$, 57$i$, 58$i$, 59$i$, 60$i$, respectively, extending similarly from the second ends 51$g$, 52$g$, 53$g$, 54$g$, 55$g$, 56$g$, 57$g$, 58$g$, 59$g$, 60$g$, respectively. The side first end faces 51$h$, 52$h$, 53$h$, 54$h$, 55$h$, 56$h$, 57$h$, 58$h$, 59$h$, 60$h$ and the second side end faces 51$i$, 52$i$, 53$i$, 54$i$, 55$i$, 56$i$, 57$i$, 58$i$, 59$i$, 60$i$ each are inclined by an inclination angle closer to the inside of 30' with respect to the radial direction of the metal base.

As shown in FIG. 38, the ridge tip 51 includes a tip end 51$e$ in a location at substantially four ninths of the tooth thickness 51$j$ from the first end 51$f$ in the thickness direction. The ridge tip 52 includes a tip end 52$e$ in a location at substantially four ninths of the tooth thickness 52$j$ from the second end 52$g$ in the thickness direction. The ridge tip 53 includes a tip end 53$e$ in a location at substantially one third of the tooth thickness 53$j$ from the first end 53$f$ in the thickness direction. The ridge tip 54 includes a tip end 54$e$ in a location at substantially one third of the tooth thickness 54$j$ from the second end 54$g$ in the thickness direction. The ridge tip 55 includes a tip end 55$e$ in a location at substantially two ninths of the tooth thickness 55$j$ from the first end 55$f$ in the thickness direction. The ridge tip 56 includes a tip end 56$e$ in a location at substantially two ninths of the tooth thickness 56$j$ from the second end 56$g$ in the thickness direction. The ridge tip 57 includes a tip end 57$e$ in a location at substantially one ninths of the tooth thickness 57$j$ from the first end 57$f$ in the thickness direction. The ridge tip 58 includes a tip end 58$e$ in a location at substantially one ninths of the tooth thickness 58$j$ from the second end 58$g$ in the thickness direction.

As shown in FIG. 38, the ridge tips 51 to 58 include first bevel surfaces 51c, 52c, 53c, 54c, 55c, 56c, 57c, 58c respectively, extending from the tip ends 51e, 52e, 53e, 54e, 55e, 56e, 57e, 58e, respectively, to the first ends 51f, 52f, 53f, 54f, 55f, 56f, 57f, 58f, respectively. The ridge tips 51 to 58 include second bevel surface 51d, 52d, 53d, 54d, 55d, 56d, 57d, 58d, respectively, extending from the tip ends 51e, 52e, 53e, 54e, 55e, 56e, 57e, 58e, respectively, to the second ends 51g, 52g, 53g, 54g, 55g, 56g, 57g, 58g, respectively.

As shown in FIG. 38, the first bevel surfaces 51c, 52c, 53c, 54c, 55c, 56c, 57c, 58c are inclined by a first tip end inclined angles 51k, 52k, 53k, 54k, 55k, 56k, 57k, 58k, respectively, with respect to a virtual line L2 extending parallel to the central axis of the metal base and through the tip end 51e. The second bevel surfaces 51d, 52d, 53d, 54d, 55d, 56d, 57d, 58d are inclined by a second tip end inclined angles 51l, 52l, 53l, 54l, 55l, 56l, 57l, 58l, respectively, with respect to the virtual line L2. Each of the first top bevel angles 51k, 52k, 53k, 54k, 55k, 56k, 57k, 58k and the second top bevel angles 51l, 52l, 53l, 54l, 55l, 56l, 57l, 58l are 5°.

As shown in FIG. 38, the first end tip 59 includes the top bevel surface 59c extending from the first end 59f to the second end 59g. The top bevel surface 59c is inclined by a top bevel angle 591 of 5° with respect to the virtual line L2. The second end tip 60 includes a top bevel surface 60c extending from the second end 60g to the first end 60f The top bevel surface 60c is inclined by a top bevel angle 60k of 5° with respect to the virtual line L2.

Figure 40:
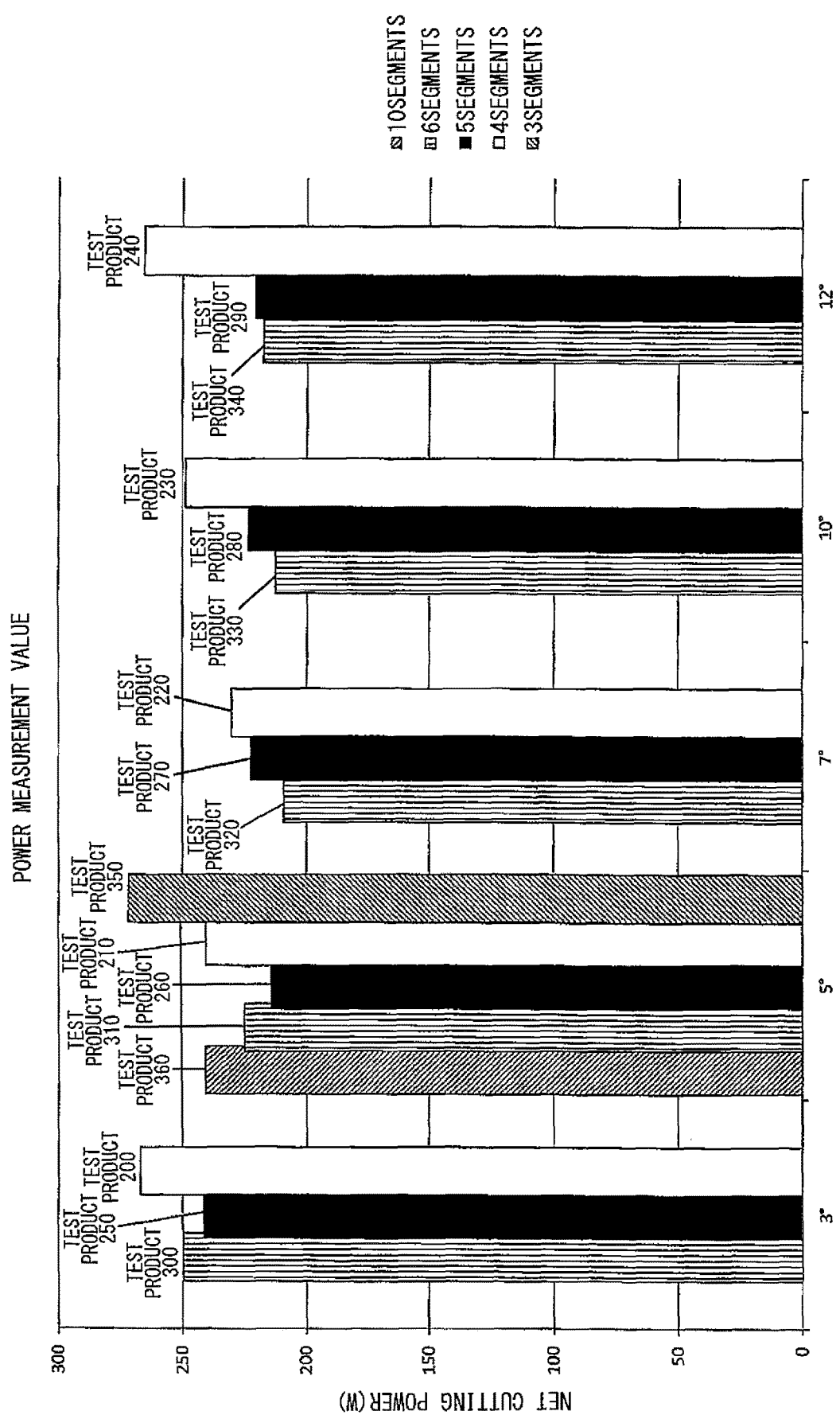
FIG. 40 is a graphical illustration of the results of FIG. 39.

FIGS. 39 and 40 show the measured results of the net cutting power when the workpiece was cut by the respective test products. These results show that the net cutting power was low in the case of the test product 320 with six segments at a top bevel angle of 7°, the test product 330 with six segments at a top bevel angle of 10°, the test product 260 with five segments at a top bevel angle of 5°, etc. The reduction rates in the net cutting power of the respective test products relative to the net cutting power of the test product 350 with three segments at the top bevel angle of 5° were calculated and summarized in FIG. 45. Focusing on the number of segments, the net cutting power of the respective test products with five segments and six segments was reduced by 8 to 23%, as compared to that of the test product 350. In the case of the respective test products with four segments, the net cutting power of the test product 210 at the top bevel angle of 5° and the test product 220 at 7° was relatively low. The net cutting power of the test product 360 with a large number of segments, for example, ten segments, was lower than that of the test product 350 with a smaller number of segments, for example, three segments.

As shown in FIG. 45, the net cutting power also showed a trend for each top bevel angle. For example, the net cutting power of the respective test products with four to six segments and at the top bevel angles of 5° and 7° was reduced by 11 to 23%, as compared to that of the test product 350. When the top bevel angle is 10°, the net cutting power was 8 to 22% lower. When the top bevel angle is 12°, the net cutting power of the test product 290 with five segments and the test product 340 with six segments was relatively low. The test results suggest a similar tendency with the top bevel angle of 5° and 7° may be observed when the top bevel angle is 6°, 8°, or the like.

Figure 42:
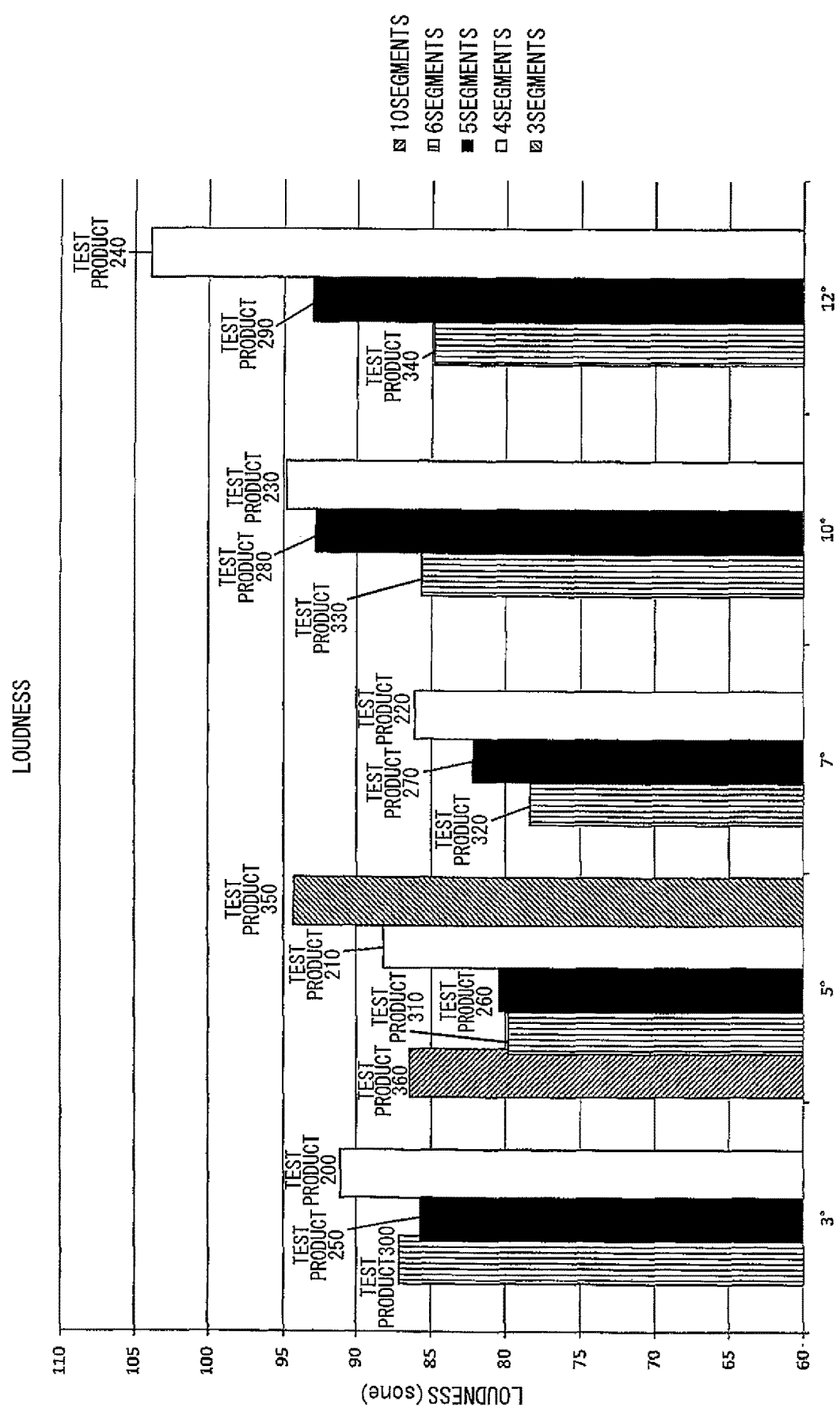
FIG. 42 is a graphical illustration of the results of FIG. 41.

In FIGS. 41 and 42, the measured results of loudness when the workpiece was cut with the respective test products are summarized. According to the measured results, the loudness was low with the test product 320 having six segments and a top bevel angle of 7°, the test product 310 having six segments and a top bevel angle of 5°, the test product 270 having five segments and a tip end angle of 7°, the test product 260 having five segments and a top bevel angle of 5°, etc. The loudness reduction rate of the each of the test products with respect to the test product 350 was calculated and summarized in FIG. 46. Tendencies of loudness were apparent depending on the number of segments. For example, the loudness was reduced in the respective test products having five segments and six segments by 1 to 17% compared to the test products 350. In the case of the respective test products having four segments, the loudness was relatively low in the test product 220 having a top bevel angle of 7°. The loudness was lower in the test product 360 having a large number of segments, for example, ten segments, than in that of the test product 350 having a small number of segments, for example, three segments.

As shown in FIG. 45, tendencies in loudness appeared for each top bevel angle. For example, the loudness of the respective test products having four to six segments at a top bevel angle of 5° and 7° was reduced by 6 to 15% as compared to that of the test product 350. In the case of the tip end angle of 3°, the loudness was 3 to 9% lower. When the top bevel angles are 10° and 12°, the loudness of the test products 330, 340 with six segments were 9 to 10% lower, which was relatively low. The test results suggest a similar tendency with the top bevel angle of 5° or 7° may be observed when the top bevel angle is, for example, 6° or the like.

Figure 44:
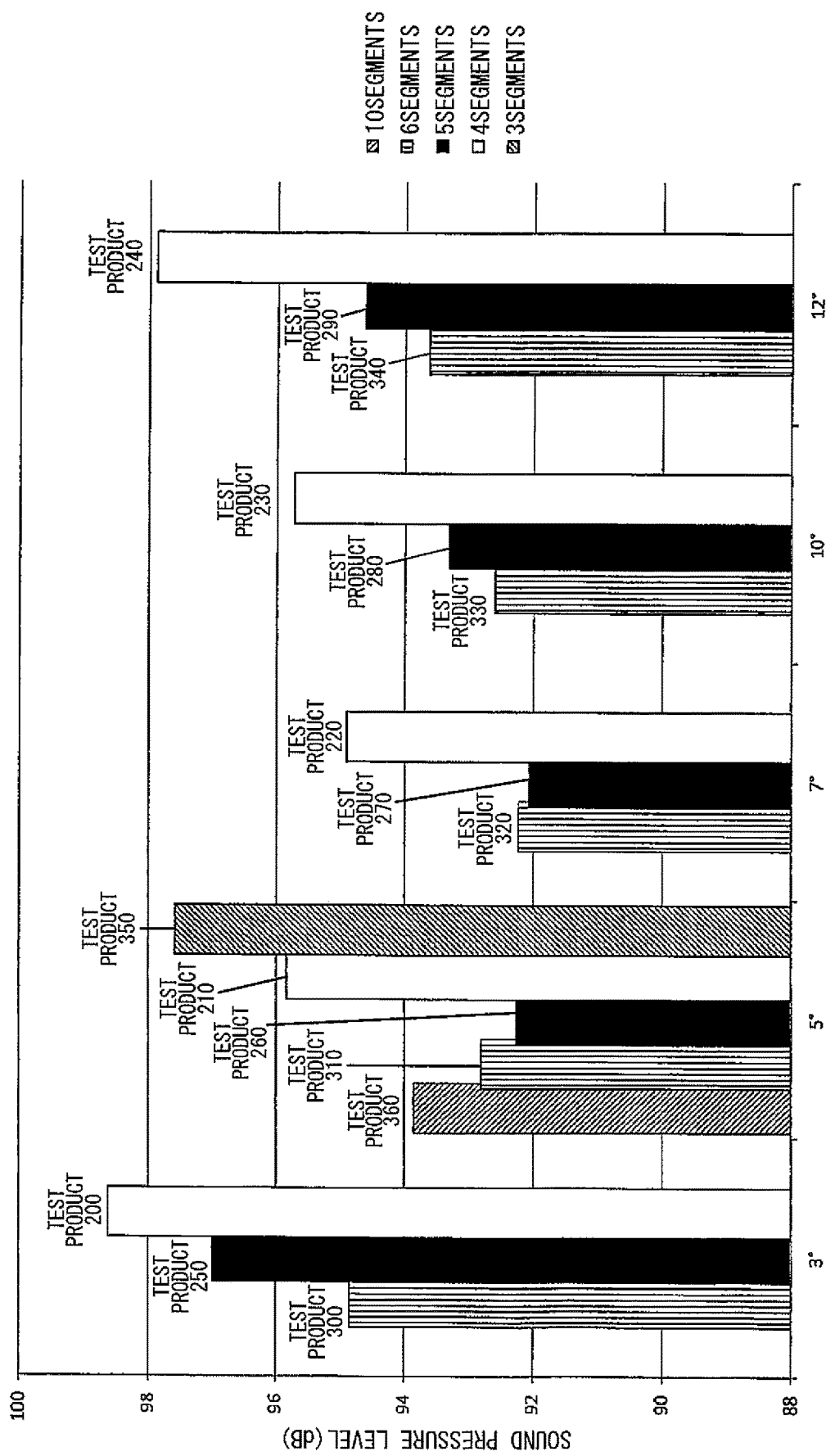
FIG. 44 is a graphical illustration of the results of FIG. 43.

The sound pressure levels were measured when the workpiece was cut with the respective test products and the measured results were summarized in FIGS. 43 and 44. According to the measured results, the sound pressure level was low with the test product 270 having five segments and a top bevel angle of 7°, the test product 320 having six segments and a top bevel angle of 7°, the test product 260 having five segments and a top bevel angle of 5°, and the test product 330 having six segments and a top bevel angle of 10°, etc. As shown in FIGS. 41 and 43, there was a tendency that if the test products had low loudness, the sound pressure level also tended to be low.

Figure 47:
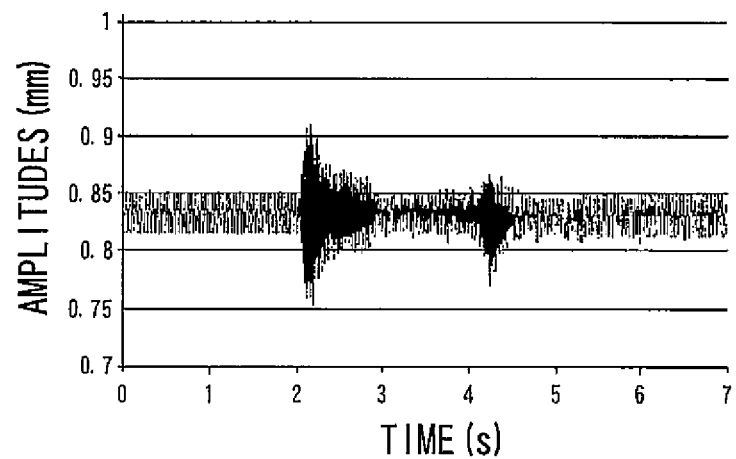
FIG. 47 is a graph illustrating an amplitude of a segmented cutting type tipped saw blade having four segments and a top bevel angle of 7° when cutting a workpiece.
Figure 48:
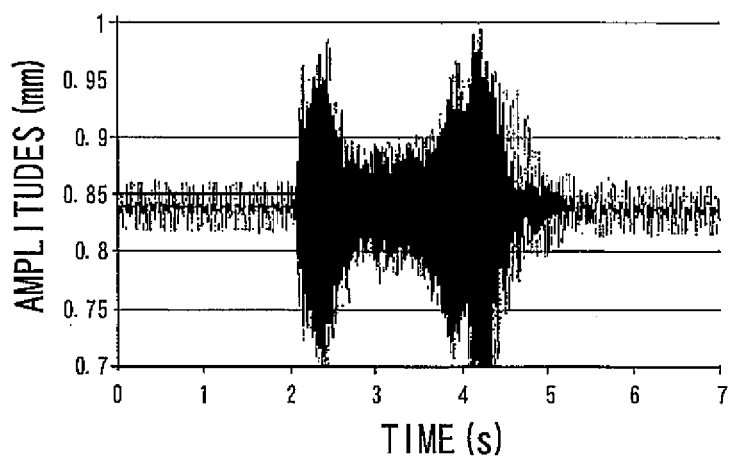
FIG. 48 is a graph illustrating an amplitude of a segmented cutting type tipped saw blade having four segments and a top bevel angle of 12° when cutting a workpiece.

The amplitudes of the test products when cutting the workpiece with the respective test products having four segments were measured and the measured results were summarized in FIGS. 47 and 48. When the amplitude of the tipped saw blade is small, there is a tendency that the cut surface is smoother and the cutting resistance lower. As shown in FIG. 47, the maximum amplitude was about 0.15 mm, which was overall relatively small, when cutting the workpiece with the test product 220 having a top bevel angle of 7°. When cutting with the test product 220, the amplitude was less than or equal to 0.05 mm, which is small, particularly while cutting substantially an intermediate portion of the workpiece. In the case of the test product 200 having a top bevel angle of 3° and the test product 210 having a top bevel angle of 5°, the magnitude of amplitude and time transition were similar to those of the test product 220.

As shown in FIG. 48, when cutting the workpiece with the test product 240 having a top bevel angle of 12°, the amplitude was relatively large from 0.25 to 0.30 mm, particularly at the beginning and the end of cutting. In the case of the test product 230 having the top bevel angle of 10°, the tendencies of the magnitude of the amplitude and the time transition lay in a substantially intermediate state between those of the test product 220 shown in FIG. 47 and the test product 240 shown in FIG. 48.

Subsequently, comparative experiments on cutting were performed with the segmented cutting type tipped saw blade having the tips in respective radial positions. In this test, an experimental machine equipped with a soundproof cover was used. The shape of the metal base, the number of teeth, and the cutting conditions of the test products are set to have a tooth thickness of 2.2 mm and body thickness of 1.8 mm. The other conditions are the same as in each of the above tests. The test products 400, 410, 420 may each have four segments and a top bevel angle of 5°. The tip end heights of the first and second ridge tips of the test products 400, 410, 420 (radial position relative to the central axis of the metal base) were set to be higher than those of the first and second end tips. Incidentally, when the tip end heights of the first and second ridge tips are lower than the first and second end tips, the contact areas of the first and second ridge tips with the workpiece will be small. It can be presumed that this may increase the cutting load of the first and second end tips, thus increasing the cutting resistance. Therefore, the measurements were performed only when the tip end heights of the first and second ridge tips are greater than or equal to the tip end heights of the first and second end tips.

Figure 49:
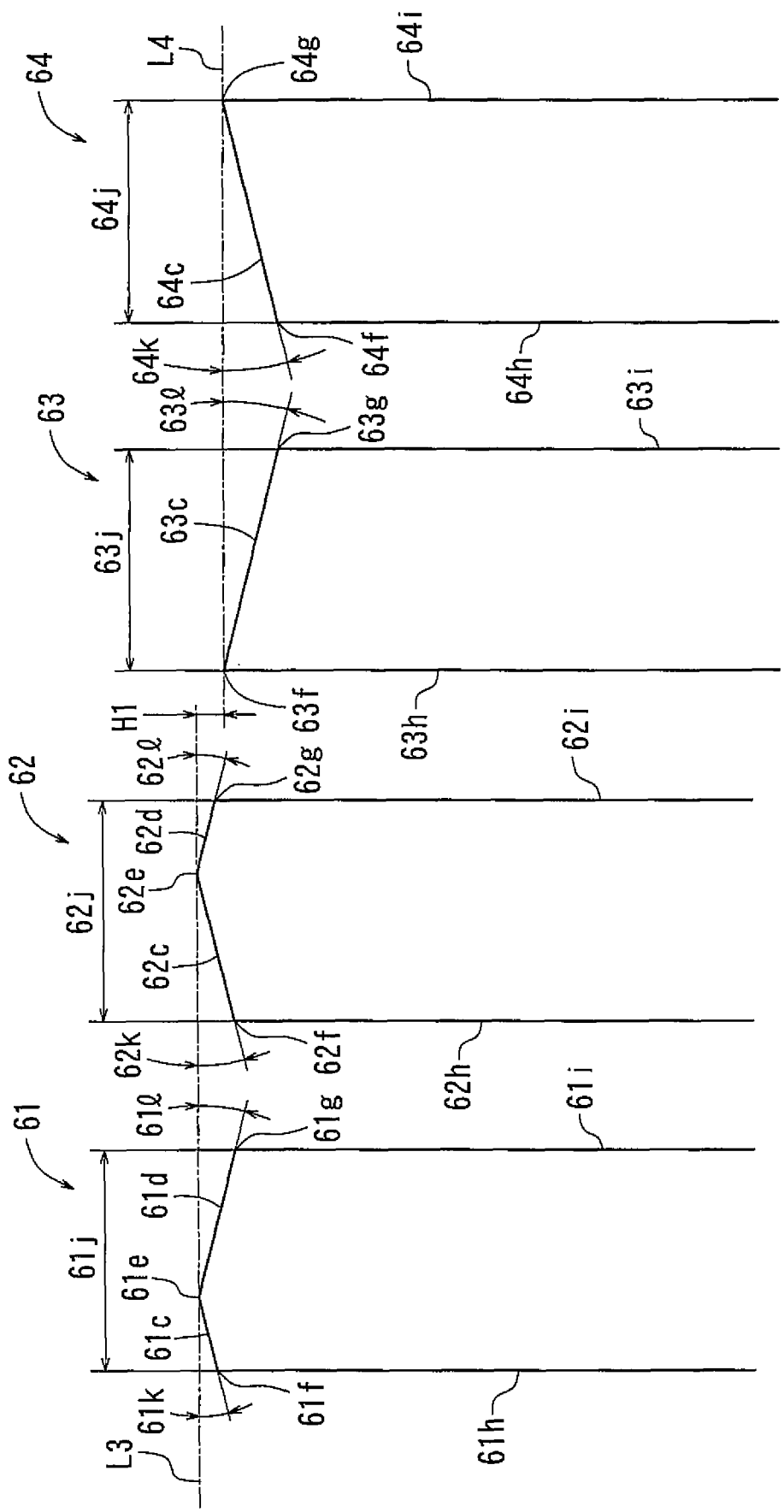
FIG. 49 is an end view in a circumferential direction illustrating tooth profiles of each of tips for a segmented cutting type tipped saw blade with four segments, wherein the ridge tips have higher tip end heights than the end tips.

As shown in FIG. 49, a first ridge tip 61, a second ridge tip 62, a second end tip 63, and a second end tip 64 include first ends 61f, 62f, 63f, 64f, respectively, and second ends 61g, 62g, 63g, 64g, respectively. The first ridge tip 61, the second ridge tip 62, the first end tip 63, and the second end tip 64 may have tooth thicknesses 61j, 62j, 63j, 64j, respectively, of, for example, 2.2 mm. First side end faces 61h, 62h, 63h, 64h extending from the first ends 61f, 62f, 63f, 64f, respectively, and second side end faces 61i, 62i, 63i, 64i extending from the second ends 61g, 62g, 63g, 64g, respectively, may be inclined by an inclination angle closer to the inside of 30' with respect to the radial direction of the metal base.

As shown in FIG. 49, the first ridge tip 61 has a tip end 61e in a position at substantially one third of the tooth thickness 61j from the first end 61f in the thickness direction. The first bevel surface 61c extends from the tip end 61e to the first end 61f. The first bevel surface 61c is inclined by a first top bevel angle 61k of 5° with respect to a virtual line L3 extending parallel to the central axis of the metal base and through the tip end 61e. The second bevel surface 61d extends from the tip end 61e to the second end 61g. The second bevel surface 61d is inclined by a second top bevel angle 61l of 5° with respect to the virtual line L3. The second ridge tip 62 has a tip end 62e in a position at substantially one third of the tooth thickness 62j from the second end 62g in the thickness direction. The first bevel surface 62c extends from the tip end 62e to the first end 62f. The first bevel surface 62c is inclined by a first top bevel angle 62k of 5° with respect to the virtual line L3. The second bevel surface 62d extends from the tip end 62e to the second end 62g. The second bevel surface 62d is inclined by a second top bevel angle 62l of 5° with respect to the virtual line L3.

As shown in FIG. 49, the first end tip 63 includes the top bevel surface 63c extending from the first end 63f to the second end 63g. The top bevel surface 63c is inclined by a top bevel angle 63l of 5° with respect to a virtual line L4 extending parallel to the central axis of the metal base and through the first end 63f. The second end tip 64 includes a top bevel surface 64c extending from the second end 64g to the first end 64f. The top bevel surface 64c is inclined by a top bevel angle 64k of 5° with respect to the virtual line L4. The virtual line L3 is located further out than the virtual line L4 in the axial direction of the metal base by a height difference H1. The height difference H1 for the test products 400, 410, 420 in FIG. 50 may be set to be 0.05 mm, 0.10 mm, 0.20 mm, respectively. The height difference H1 of the test products 400, 410, 420 may be 2%, 5%, and 9%, respectively, of the tooth thickness of each test product.

The measured test results of the net cutting power, loudness, and sound pressure level when the workpiece is cut by the test products 210, 400, 410, 420 are summarized in FIG. 50. As shown in FIGS. 50 and 51, the net cutting power when cutting the workpiece by the test products 400, 410, 420 was 2 to 4% lower than when cut with the test product 210. Particularly, when cutting by the test product 400, with the height difference H1 shown in FIG. 49 set to be 0.05 mm, the net cutting power was 4% lower. As shown in FIGS. 50 and 52, the loudness when cutting the workpiece by the test products 400, 410, 420 was 6 to 25% higher than when cut by the test product 210. Particularly, there was a tendency that the loudness increases as the height difference H1 shown in FIG. 49 increases. The sound pressure level also tended to increase or decrease similarly with the increase and decrease in loudness. Therefore, for example, the first and second ridge tips may be provided to be higher than the first and second end tips by the length of 2 to 9% of the tooth thickness of each of the tips. This suggests that the degree of noise may tend to be relatively greater while the cutting resistance is relatively lower.

As shown in FIG. 49, radial positions of the respective tip ends 61e, 62e of the first ridge tip 61 and the second ridge tip 62 are 0 to 9%, more preferably 0 to 2%, of the tooth thicknesses 61j, 62h, 63j, 64j further radially outward (upper side shown in figure) than the radial positions of the first end 63f of the first end tip 63 and the second end 64g of the second end tip 64. Therefore, the first ridge tip 21 and the second ridge tip 62 come more reliably into contact with the workpiece to cut the workpiece. This allows the cutting power to be distributed in a well balanced manner among each of the tips. As a result, the cutting resistance will not be concentrated on specific tips and the cutting resistance can be reduced.

Various modifications may be made to the segmented cutting type tipped saw blades 1, 2, 3 according to each of the above described embodiments. For example, the groups of tips may be made of tips having tip end profiles of seven or more types. The arrangement orders of each of the tips shown in FIGS. 1, 4, 7 in the circumferential direction of the metal base 4 or the intervals between the adjacent tips may be appropriately changed. The positions of the tip ends 11e, 12e, 21e, 22e, 23e, 31e, 32e, 33e, 34e shown in FIGS. 3, 6, 9 in the thickness direction of the metal base 4 shall not be limited to the positions described in each of the embodiments, but may be appropriately changed. For example, the tip end 11e may be provided in a position at substantially two fifths of the tooth thickness 11j from the first end 11f in the thickness direction between the first end 11f and the second end 11g. For example, the top bevel angles of each of the tips may be appropriately changed to 6°, 8°, etc. In the embodiments, the segmented cutting type tipped saw blade for metal working was exemplary described, however, for example, a segmented cutting type tipped saw blade may also be adopted for resin working, etc.

The invention claimed is:
1. A segmented cutting type tipped saw blade, the saw blade comprising:
   a disc-shaped metal base having a central axis of rotation, an axial thickness, and a radially outer periphery; and
   a plurality of circumferentially adjacent tips extending radially outward from the radially outer periphery of the metal base, the plurality of tips comprising:

a first end tip including a tip end projecting radially outward at a first axial end of the first end tip as viewed in a circumferential direction;

a second end tip including a tip end projecting radially outward at a second axial end of the second end tip as viewed in the circumferential direction;

a first ridge tip including a tip end projecting radially outward at a first position between a first axial end of the first ridge tip and a second axial end of the first ridge tip as viewed in the circumferential direction;

a second ridge tip including a tip end projecting radially outward at a second position axially positioned between a first axial end of the second ridge tip and a second axial end of the second ridge tip as viewed in the circumferential direction; and a third ridge tip including a tip end projecting radially outward at a third position axially positioned between a first axial end of the third ridge tip and a second axial end of the third ridge tip as viewed in the circumferential direction, wherein:

the first end tip has a top bevel surface extending from the tip end of the first end tip to a second axial end of the first end tip and the second end tip has a top bevel surface extending from the tip end of the second end tip to a first axial end of the second end tip, the first ridge tip, the second ridge tip, and the third ridge tip each have a first bevel surface extending from the respective tip ends to the respective first axial ends and a second bevel surface extending from the respective tip ends to the second axial ends, the top bevel surface of the first end tip, the top bevel surface of the second end tip, the first bevel surface and the second bevel surface of the first ridge tip, and the first bevel surface and the second bevel surface of the second ridge tip are each oriented at a top bevel angle with respect to a virtual line extending parallel to the central axis through the respective tip ends, and each top bevel angle is greater than or equal to 5° and less than or equal to 10°.

2. The segmented cutting type tipped saw blade of claim 1, wherein:

the plurality of tips further comprises a fourth ridge tip having a tip end projecting radially outward at a fourth position between a first axial end of the fourth ridge tip and a second axial end of the fourth ridge tip as viewed in the circumferential direction, wherein the fourth ridge tip includes a first bevel surface extending from the tip end of the fourth ridge tip to the first axial end of the fourth ridge tip and a second bevel surface extending from the tip end of the fourth ridge tip to the second end of the fourth ridge tip, the first and second bevel surfaces of the fourth ridge tip are oriented at a top bevel angle with respect to the virtual line extending parallel to the central axis through the tip end of the fourth ridge tip, and the top bevel angle of the fourth ridge tip are greater than or equal to 5° and less than or equal to 10°.

3. The segmented cutting type tipped saw blade of claim 2, wherein the plurality of tips are formed of only 6 types of tips.

4. The segmented cutting type tipped saw blade of claim 1, wherein each top bevel angle is greater than or equal to 6° and less than or equal to 8°.

5. The segmented cutting type tipped saw blade of claim 1, wherein each top bevel angle of the plurality of tips and each radial position of each tip end is identical.

6. The segmented cutting type tipped saw blade of claim 1, wherein a radial position of each tip end of the first ridge tip and the second ridge tip is 0 to 9% of the thickness direction further radially outward than a radial position of each tip end of the first end tip and the second end tip.

7. The segmented cutting type tipped saw blade of claim 1, wherein the plurality of tips are formed of only 5 types of tips.

8. A segmented cutting type tipped saw blade, the saw blade comprising:

a disc-shaped metal base having a central axis of rotation, an axial thickness, and a radially outer periphery; and a plurality of circumferentially adjacent tips extending radially from the radially outer periphery of the metal base, the plurality of the tips comprising:

a first end tip including a tip end projecting radially outward at a first axial end of the first end tip as viewed in a circumferential direction;

a second end tip including a tip end projecting radially outward at a second axial end of the second end tip as viewed in the circumferential direction;

a first ridge tip including a tip end projecting radially outward at a first position axially positioned between a first axial end of the first ridge tip and a second axial end of the first ridge tip as viewed in the circumferential direction; and a second ridge tip including a tip end projecting radially outward at a second position axially positioned between a first axial end of the second ridge tip and a second axial end of the second ridge tip as viewed in the circumferential direction, wherein:

the first end tip has a top bevel surface extending from the tip end of the first end tip to a second axial end of the first end tip and the second end tip has a top bevel surface extending from the tip end of the second end tip to a first axial end of the second end tip, the first ridge tip and the second ridge tip each have a first bevel surface extending from the respective tip ends to the respective first axial ends, and a second bevel surface extending from the respective tip ends to the respective second axial ends, the top bevel surface of the first end tip, the top bevel surface of the second end tip, the first bevel surface and the second bevel surface of the first ridge tip, and the first bevel surface and the second bevel surface of the second ridge tip are each oriented at a top bevel angle with respect to a virtual line extending parallel to the central axis through the respective tip ends, and each top bevel angle is greater than or equal to 3° and less than or equal to 10°.

9. The segmented cutting type tipped saw blade of claim 8, wherein each top bevel angle is greater than or equal to 5° and less than or equal to 7°.

10. The segmented cutting type tipped saw blade of claim 8, wherein each top bevel angle is greater than or equal to 5° and less than or equal to 10°.

11. The segmented cutting type tipped saw blade of claim 8, wherein:

the plurality of tips further comprises a third ridge tip including a tip end projecting radially outward at a third position axially positioned between a first axial end of the third ridge tip and a second axial end of the third ridge tip as viewed in the circumferential direction, the third ridge tip has a first bevel surface extending from the tip end toward the first end and a second bevel surface extending from the tip end toward the second end, the first and second bevel surfaces of the third ridge tip are oriented at a top bevel angle with respect to the virtual line extending parallel to the central axis through the tip end, and the top bevel angle of the third ridge tip are greater than or equal to 3° and less than or equal to 10°.

12. The segmented cutting type tipped saw blade of claim 11, wherein each top bevel angle of the third ridge tip is greater than or equal to 5° and less than or equal to 10°.

13. The segmented cutting type tipped saw blade of claim 11, wherein each top bevel angle of the third ridge tip is greater than or equal to 3° and less than or equal to 7°.

14. The segmented cutting type tipped saw blade of claim 11, wherein:

the plurality of tips further comprises a fourth ridge tip including a tip end projecting radially outward at a fourth position axially positioned between a first axial end of the fourth ridge tip and a second axial end of the fourth ridge tip as viewed in the circumferential direction, the fourth ridge tip has a first bevel surface extending from the tip end of the fourth ridge tip to the first axial end of the fourth ridge tip and a second bevel surface extending from the tip end of the fourth ridge tip to the second axial end of the fourth ridge tip, the first and second bevel surfaces of the fourth ridge tip is oriented at a top bevel angle with respect to the virtual line extending parallel to the central axis through the tip end, and the top bevel angle of the fourth ridge tip are greater than or equal to 3° and less than or equal to 10°.

15. The segmented cutting type tipped saw blade of claim 14, wherein each top bevel angle of the fourth ridge tip is greater than or equal to 5° and less than or equal to 10°.

16. The segmented cutting type tipped saw blade of claim 14, wherein each top bevel angle of the fourth ridge tip is greater than or equal to 5° and less than or equal to 7°.

* * * * *